US011206543B2

(12) United States Patent
Do et al.

(10) Patent No.: US 11,206,543 B2
(45) Date of Patent: Dec. 21, 2021

(54) LOCATION-BASED ADAPTIVE DEVICE SECURITY SYSTEM AND METHOD

(71) Applicant: Avast Software s.r.o., Prague (CZ)

(72) Inventors: Juyong Do, Cupertino, CA (US); Rajarshi Gupta, Los Altos, CA (US); Ondřej Vlček, Prague (CZ)

(73) Assignee: Avast Software s.r.o., Prague (CZ)

( * ) Notice: Subject to any disclaimer, the term of this patent is extended or adjusted under 35 U.S.C. 154(b) by 338 days.

(21) Appl. No.: 16/293,152

(22) Filed: Mar. 5, 2019

(65) Prior Publication Data

US 2020/0288306 A1 Sep. 10, 2020

(51) Int. Cl.

| | |
|---|---|
| ***H04W 12/37*** | (2021.01) |
| ***G06F 21/55*** | (2013.01) |
| ***H04L 29/06*** | (2006.01) |
| ***G06N 20/00*** | (2019.01) |

(52) U.S. Cl.

CPC .......... *H04W 12/37* (2021.01); *G06F 21/552* (2013.01); *G06F 21/554* (2013.01); *G06N 20/00* (2019.01); *H04L 63/0272* (2013.01); *H04L 63/20* (2013.01); *G06F 2221/034* (2013.01); *G06F 2221/2111* (2013.01)

(58) Field of Classification Search

CPC ..... H04W 12/37; G06N 20/00; G06F 21/552; G06F 21/554; G06F 2221/034; G06F 2221/2111; H04L 63/0272; H04L 63/20

See application file for complete search history.

(56) References Cited

U.S. PATENT DOCUMENTS

2013/0174259 A1 * 7/2013 Pearcy .................... H04L 41/06 726/25

* cited by examiner

*Primary Examiner* — Hee K Song

(74) *Attorney, Agent, or Firm* — Dovas Law, P.C.

(57) ABSTRACT

A method includes monitoring data security events on mobile computing devices and positions of the mobile computing devices when the plurality of data security events occurred. A plurality of demographic information of the plurality of geographic positions are determined and a classifier is trained based on the data security events and demographic information. A particular mobile computing device is determined to be located at a particular geographic location and particular demographic information of the particular geographic location is determined. The classifier is applied to the particular demographic information and a particular security risk prediction of the particular geographic location is generated. A particular security measure is activated on the particular mobile computing device based on the particular security risk prediction.

44 Claims, 17 Drawing Sheets

LOCATION-BASED ADAPTIVE DEVICE SECURITY SYSTEM AND METHOD

FIELD OF INVENTION

The invention relates generally to computing device security, and more particularly to adaptive computing device security.

BACKGROUND

Security threats abound for network-connectable mobile computing devices such as smart phones, tablet computers, and laptop computers. These devices generally store and transmit sensitive user-identifying data of the device user. Malicious applications or attacks to a communications network over which a mobile computing device is operating may compromise a user's sensitive data or identity. Various security protocols implementing for example password, fingerprint or face recognition authentication may be enabled on mobile computing devices to reduce the risk of security threats. While properly enabled security protocols may decrease security risks on a device, a user may be inconvenienced by these protocols and disable them, therefore rendering their device vulnerable. Threats to mobile computing devices are often dependent on geographic location and the network over which the devices are operating. A secure wireless network at a private residence or place of employment for example is likely to have a lower likelihood of security threats than a public wireless network in a public space.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of protecting computing devices operating in a network from security threats is provided. The method includes monitoring a plurality of data security events on a plurality of mobile computing devices. The method further includes monitoring a plurality of geographic locations of the plurality of mobile computing devices, the plurality of geographic locations including a plurality of geographic positions of the plurality of mobile computing devices when the plurality of data security events occurred. A plurality of demographic information of the plurality of geographic positions are determined and one or more classifiers are trained based on the plurality of data security events and the plurality of demographic information. A particular mobile computing device is determined to be located at a particular geographic location and particular demographic information of the particular geographic location is determined. The one or more classifiers are applied to the particular demographic information and a particular security risk prediction of the particular geographic location is generated based on the applying of the one or more classifiers. A particular security measure is activated on the particular mobile computing device based on the particular security risk prediction.

Another method of protecting a computing device from security threats is provided herein. The method includes collecting indications of security events for a geographic area. A security risk prediction is mapped to a geographic location of the geographic area based on the security events. A particular mobile computing device is determined to be located at the geographic location, and a security measure is activated on the particular mobile computing device based on the security risk prediction of the geographic location.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 1 shows a system for selectively enabling particular security protocols on computing devices according to the illustrative embodiments.

FIGS. 2A, 2B, and 3 are flow charts showing methods for protecting a computing device from security threats.

FIGS. 4A, 4B, 4C are diagrams figuratively showing classifiers in the form of artificial neural networks for predicting security events.

FIGS. 5A, 5B, and 5C show example interactive displays for providing alerts regarding security risk levels and security measures enabled on a computing device.

FIGS. 6A, 6B, and 6C show exemplary security risk maps generated according to described methods.

Figure 8A:
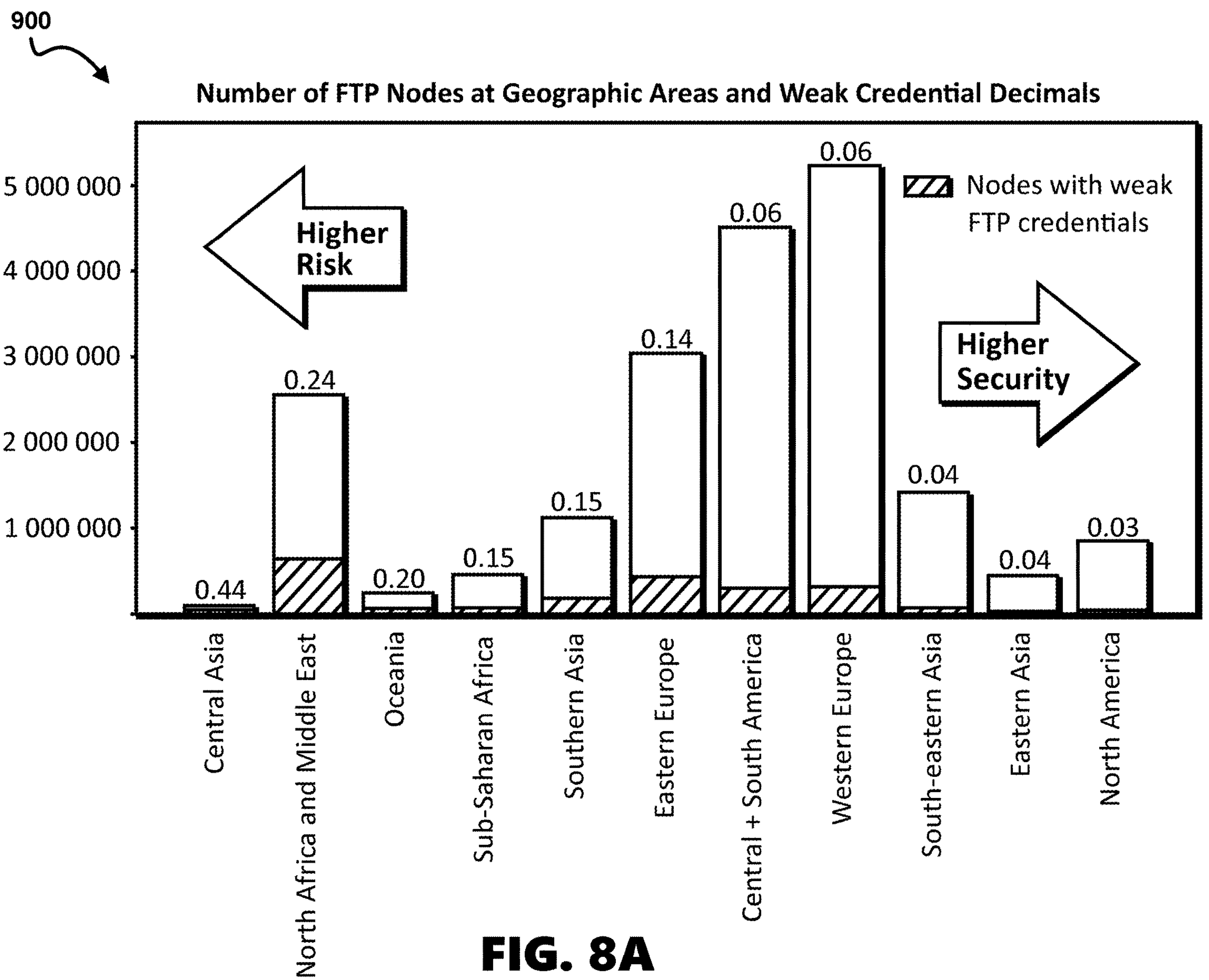
Figure 8B:
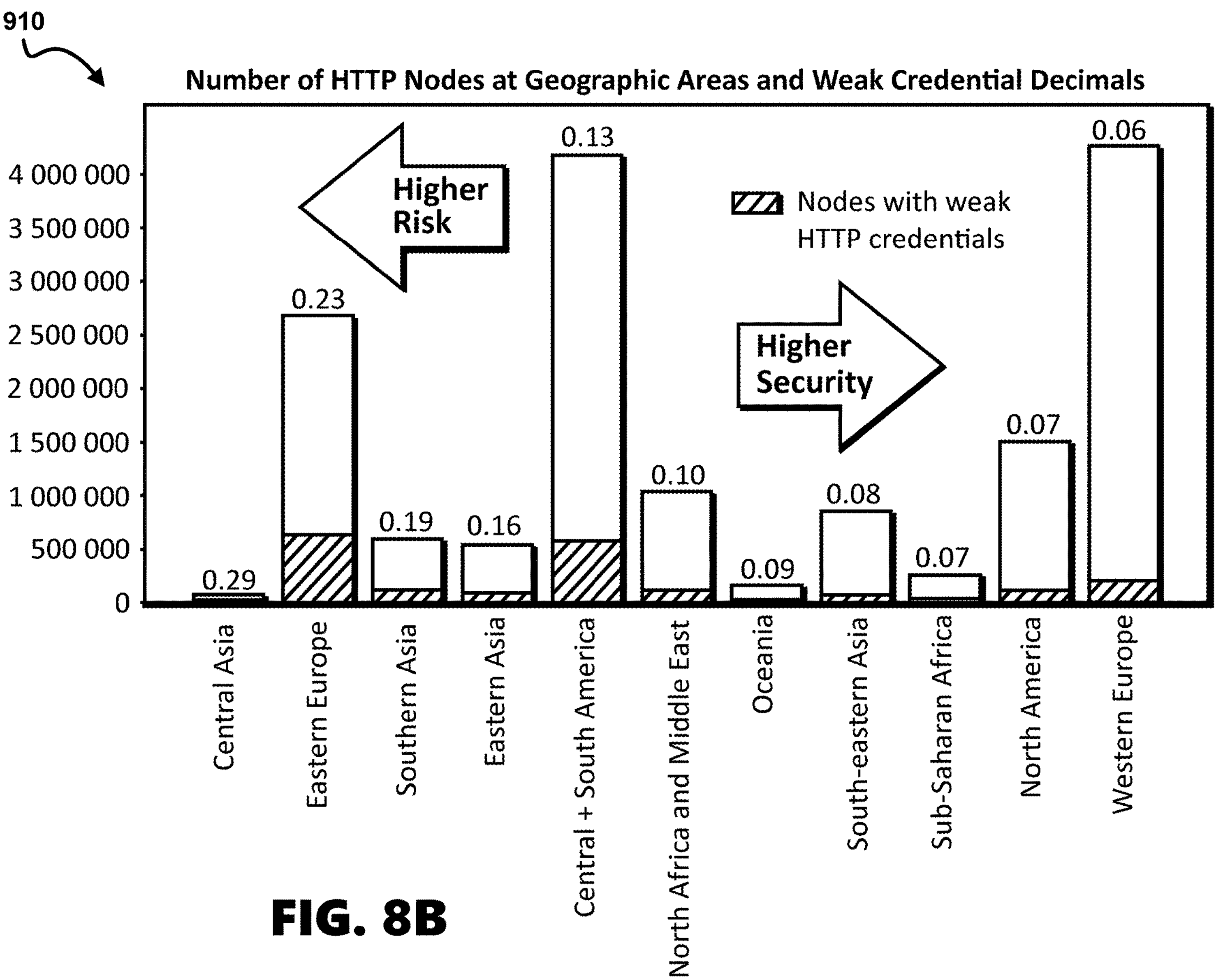
Figure 8C:
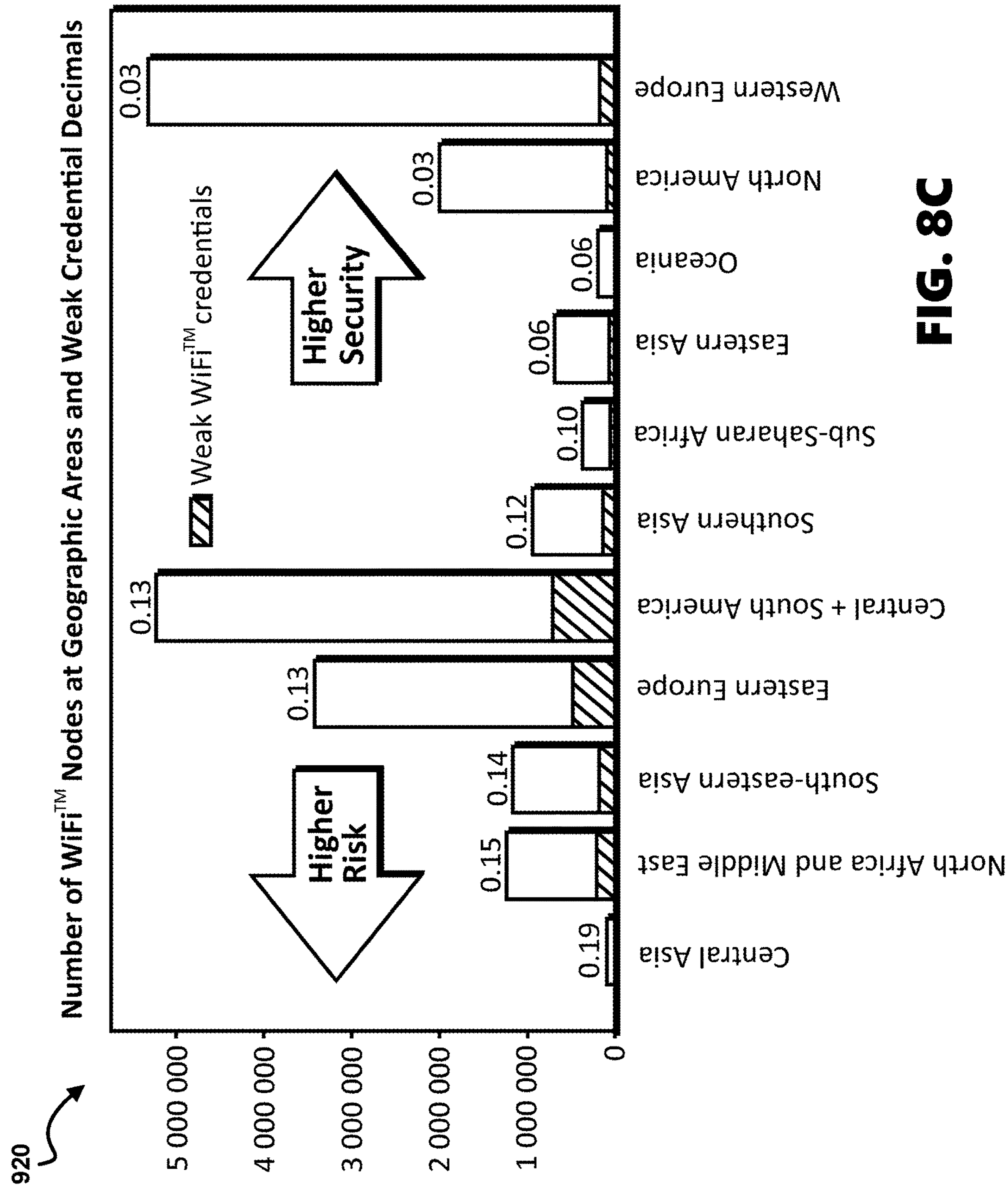

FIGS. 8A, 8B, and 8C are bar charts showing numbers of network nodes in particular geographic areas and corresponding credential qualities.

Figure 9:
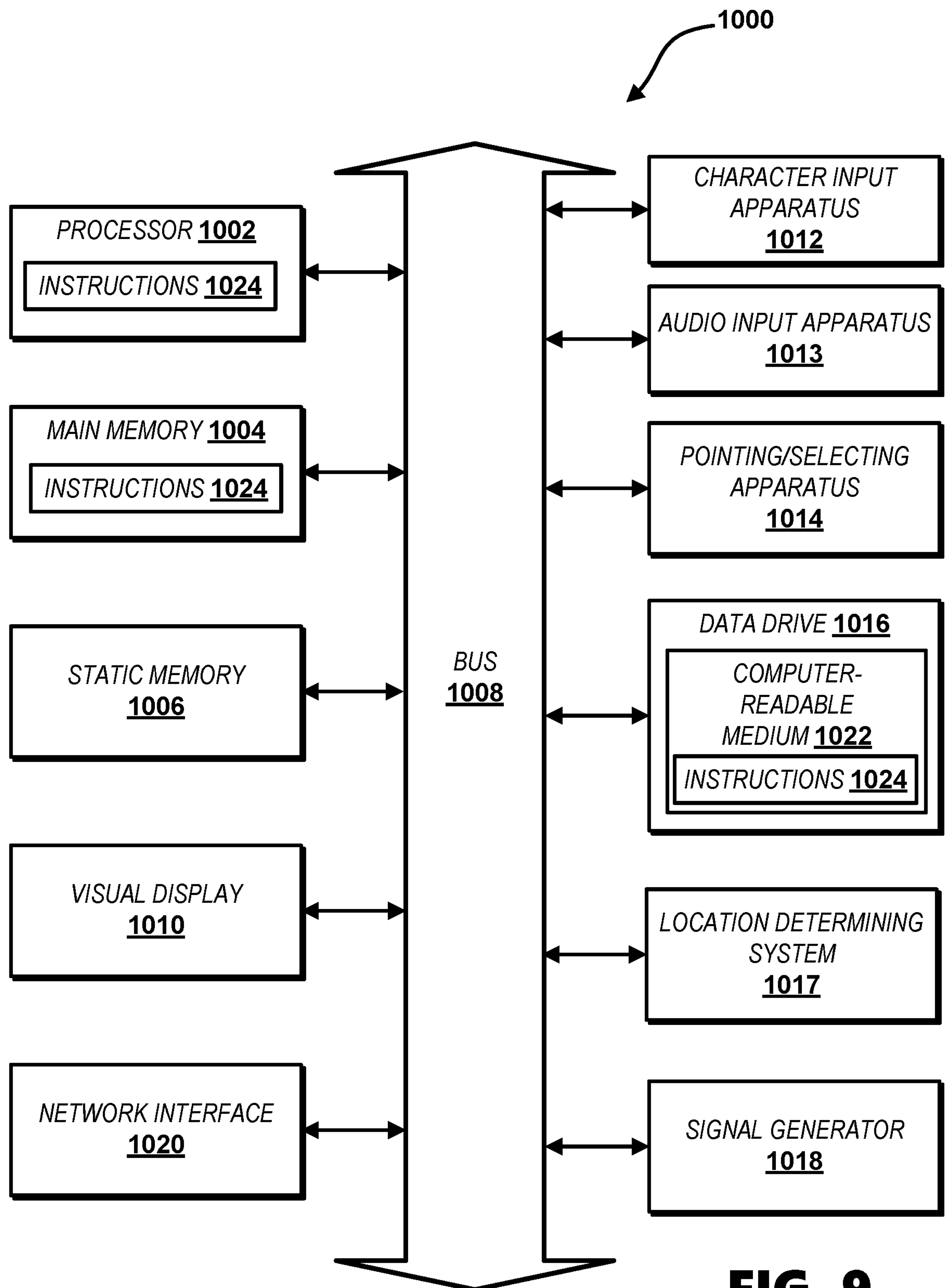

FIG. 9 is an illustrative computer system for performing described methods according to the illustrative embodiments.

DETAILED DESCRIPTION OF ILLUSTRATIVE EMBODIMENT(S)

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Figure 1:
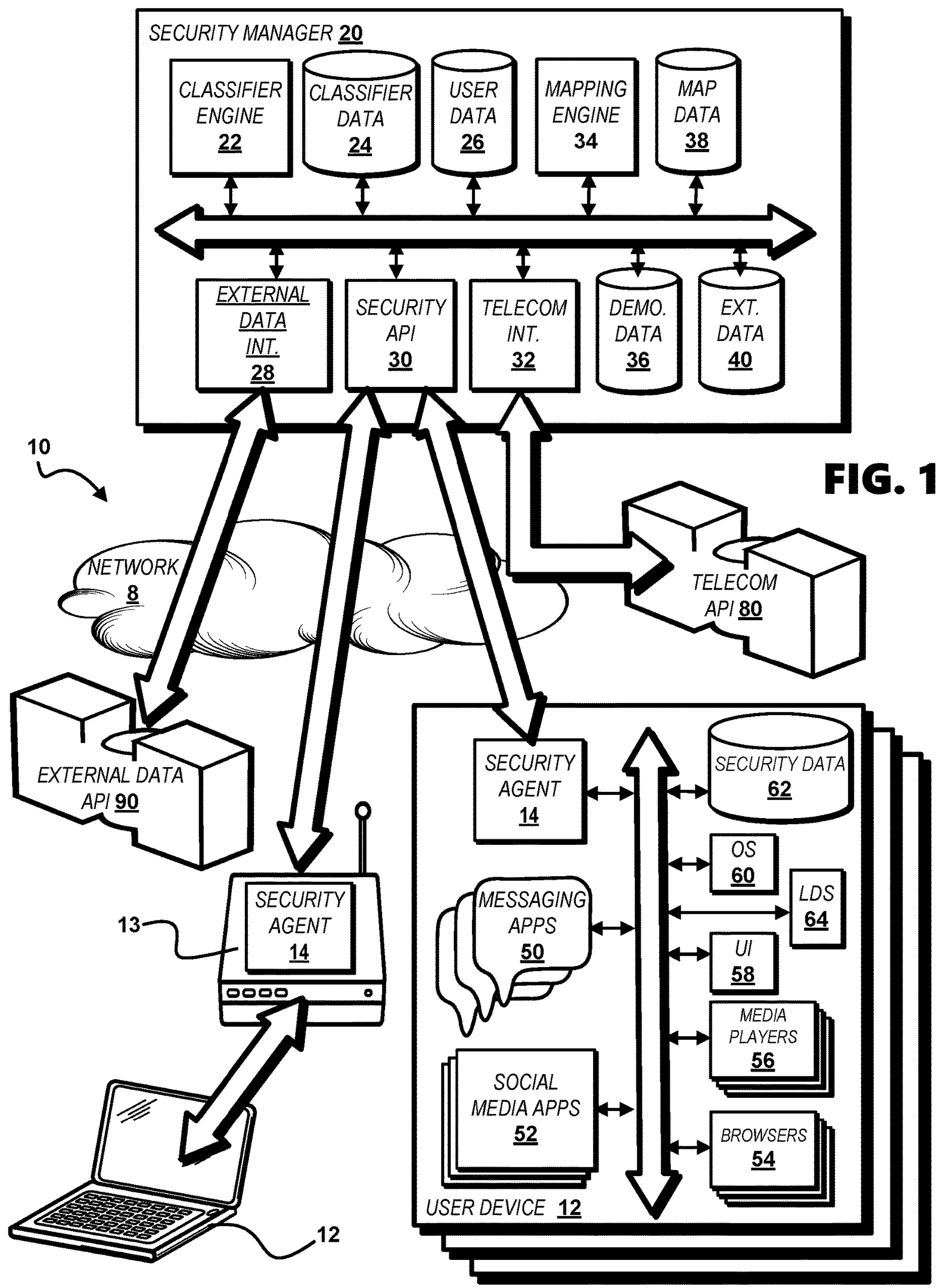

Referring to FIG. 1, a system 10 for enabling setting security protocols on computing devices 12 (hereinafter "user devices 12") is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks.

The user devices 12 operate in the network 8, which devices 12 can be mobile and as such can be located in different geographic areas. The user devices 12 can each include for example a smart phone or other cellular-enabled mobile device configured to operate in a wireless telecommunications network. Alternatively, the user devices 12 can include a personal computer, tablet device, video game console, television controller, set-top box, digital media player or other computing device.

A user operates a user device 12 with a security agent 14 active. Software and/or hardware residing on the user device 12 enables the security agent 14 to monitor and set security protocols to restrict use of the user device 12 based on a determined security risk of a determined location of the user device 12. Software and/or hardware residing on the user device 12 further enables messaging applications 50, for example Short Message Service ("SMS") messaging applications or applications supporting other messaging protocols, for example via 3G/4G/5G cellular protocols, WiFi™ protocol or TCP/IP through the Internet. A user can implement the messaging applications 50 for example to connect to a message forwarding center, for example via GSM wireless protocol or TCP/IP through the Internet, to communicate with other user devices 12. Social media applications 52, Internet browsers 54, and electronic media players 56 are also enabled by software and/or hardware including an operating system 60 residing on the user device 12.

The security agent 14 can be configured as a standalone application executable by a processor of the user device 12 in communication with the messaging applications 50, social media applications 52, browsers 54, and electronic media players 56 or other communication facilitating or content providing applications. Alternatively, the security agent 14 can be provided as a processor-implemented add-on application integral with the messaging applications 50, social media applications 52, browsers 54, or other communication facilitating or content providing applications. The security agent 14 enables authentication protocols and blocking of applications, electronic communications, and electronic media available to a user of the user device 12 through the messaging applications 50, social media applications 52, browsers 54, electronic media players 56 or other communication facilitating or content providing applications. The security agent 14 can further enable a virtual private network ("VPN") through which the messaging applications 50, social media applications 52, browsers 54, electronic media players 56 or other communication facilitating or content providing applications are operated. Alternatively, the security agent 14 can require initiation of a VPN as a precondition to initiating the messaging applications 50, social media applications 52, browsers 54, electronic media players 56 or other communication facilitating or content providing applications.

The security agent 14 can alternatively be executed on a processor-enabled router 13 such as a wireless router or other networking device that forwards data packets between computer networks. The router 13 is beneficially accessible via wired or wireless communication to the user devices 12 on which a security agent 14 is installed and active or other user devices 12 on which a security agent 14 is not installed or active. Software and/or hardware residing on the router 13 enables the security agent 14 to monitor, enable security protocols, and restrict network communications from and to user devices 12 via the router 13. The security agent 14 installed on the router 13 is particularly suited to monitor, enable security protocols, and control of relatively stationary user devices 12 such as video game consoles, televisions, set-top boxes, and desktop computers.

The system 10 includes a network-connectable processor-enabled security manager 20 used for setting security protocols and controlling use of the user devices 12 and router 13. The operation of the security manager 20 is described herein with respect to the user devices 12 and the router 13. One skilled in the art will recognize that the security manager 20 can operate with other suitable wired or wireless network-connectable computing systems. The security manager 20 includes a classifier engine 22, a classifier datastore 24, a user datastore 26, an external data interface 28, a security application program interface ("API") 30, a telecommunication carrier ("telecom") interface 32, a mapping engine 34, a demographics datastore 36, a map datastore 38, and an external data datastore 40.

The security manager 20 can be implemented on one or more network-connectable processor-enabled computing systems, for example in a peer-to-peer configuration, and need not be implemented on a single system at a single location. The security manager 20 is configured for communication via the communications network 8 with other network-connectable computing systems including the user device 12, router 13, and a telecommunication carrier system implementing an application program interface ("Telecom API") 80 enabled for enabling and controlling communications of the user device 12. Alternatively, the security manager 20 or one or more components thereof can be executed on the user device 12, the router 13, or other system.

Figure 2A:
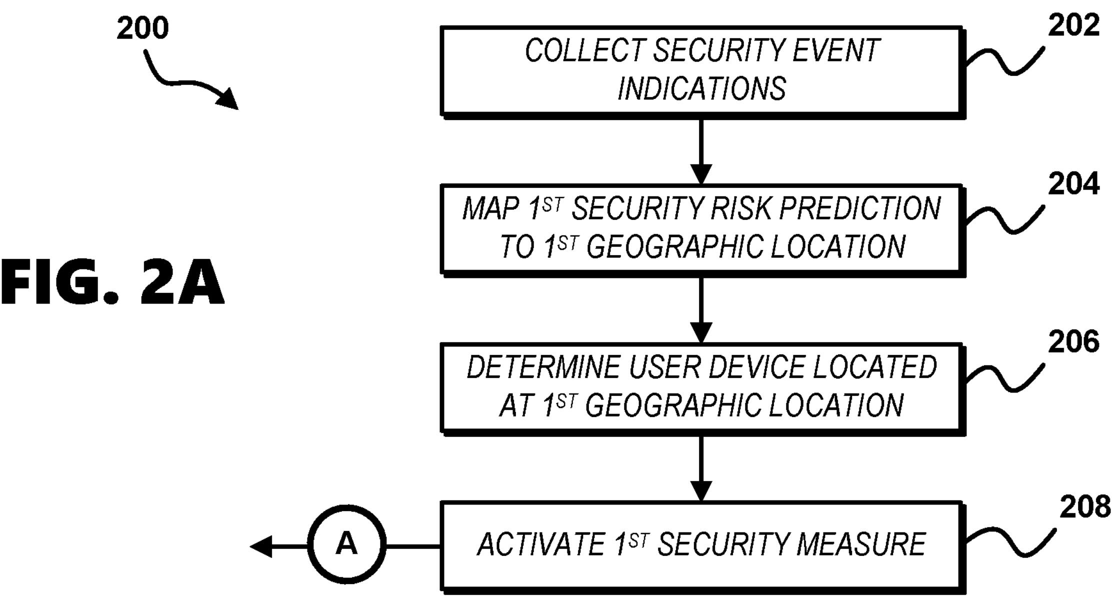

Referring to FIG. 2A, a flowchart shows a method 200 of protecting a network-connectable computing device from security threats. The method 200 and associated processes are described with reference to the components of the system 10 shown in FIG. 1, including the user device 12, the router 13, the processor-enabled security manager 20, and the security agent 14. Alternatively, the method 200 can be performed via other suitable systems.

In a step 202, indications of security events for a geographic area are collected. Security events are collected for example by the security manager 20 from security agents 14 executed on a plurality of user devices 12. Alternatively security events are collected from external data application program interfaces ("APIs") 90, which data can be stored in the external data datastore 40. The security events can include cyber security risk/breach information (hereinafter "data security events") such as computer virus attack events, computer hacking events, or computer eavesdropping events. Beneficially, security agents 14 executed on user devices 12 and routers 13 collect virus detection logs along with the geographic locations where viruses were detected. Wireless (e.g., WiFi™) credential strength (e.g., password strength) for access points including wireless routers and their corresponding geographic locations is also collected by the security agents 14 and provided to the security manager 20. Hypertext Transfer Protocol ("HTTP") and File Transfer Protocol ("FTP") credential strength information and corresponding geographic location information is collected by the security agents 14 on the user devices 12 and routers 13 for example via network traffic logs. Location information can be determined by a location determining system ("LDS") 64 of a user device 12, for example a global positioning system ("GPS") including a GPS receiver. For data security events without corresponding geographic location information, a reverse geo-lookup of a media access control ("MAC") address or Internet Protocol ("IP") address, for example a MAC address or IP address of a WiFi™ wireless access point, can be used to determine a data security event location. Data security events can alternatively include freeze events initiated by a carrier system on user devices 12 or initiations of device tracking applications on user devices 12. The security agents 14 are configured to collect indications of initiated freeze events and device tracking events and determine corresponding geographic locations of the freeze events and the initiations of the device tracking applications on the user devices 12.

The security manager 20 can further collect via the external data interface 28 security events including public or private information available through an external data application program interface ("API") 90 enabled by a network-accessible data repository (e.g., a public government data repository). Public data available via a network-accessible data repository can include direct security risk information such as geographically mapped physical crime reports (e.g., device theft, physical assault, or kidnapping) or geographically mapped demographic information such as income distribution, housing price, or school rating.

The mapping engine 34 is configured to perform a mapping of security risk predictions via data determined via the security agents 14 or data collected via external data APIs 90, which mapping can be maintained in the map datastore 38. The mapping includes generating an assessment of security risks of locations for which data is available. Referring to FIG. 8A, based on an experimental collection of indications according to methods described herein, an example File Transfer Protocol (hereinafter "FTP") credential chart 900 was generated which shows a number of analyzed FTP nodes (e.g., a user device 12 or router 13) in various geographic regions and an assessment of the security risk of those regions in the form of decimals of FTP nodes including weak FTP credentials in each geographic region. Predetermined criteria were used in determining whether FTP credentials were weak. The FTP credential chart 900 indicates that 3 percent of FTP nodes in North America include weak FTP credentials, whereas 44 percent of FTP nodes in Central Asia include weak FTP credentials. Referring to FIG. 8B, based on an experimental collection of indications according to methods described herein, an example Hypertext Transfer Protocol (hereinafter "HTTP") credential chart 910 was generated which shows a number of analyzed HTTP nodes (e.g., a user device 12 or router 13) in various geographic regions and an assessment of the security risk of those regions in the form of decimals of HTTP nodes including weak HTTP credentials in each geographic region. Predetermined criteria were used in determining whether HTTP credentials were weak. The HTTP credential chart 910 indicates that 6 percent of HTTP nodes in Western Europe include weak HTTP credentials whereas 29 percent of HTTP nodes in Central Asia include weak HTTP credentials. Referring to FIG. 8C, based on an experimental collection of indications according to methods described herein, an example WiFi™ credential chart 920 was generated which shows a number of analyzed WiFi™ nodes (e.g., a user device 12 or router 13) in various geographic regions and an assessment of the security risk of those regions in the form of decimals of WiFi™ nodes including weak WiFi™ credentials in each geographic region. Predetermined criteria were used in determining whether WiFi™ credentials were weak. The WiFi™ credential chart 920 indicates that 3 percent of WiFi™ nodes in Western Europe include weak WiFi™ credentials whereas 19 percent of WiFi™ nodes in Central Asia include weak WiFi™ credentials.

Referring back to the method 200, a first security risk prediction is mapped to a first geographic location of the geographic area based on the security events (step 204). For example, based on the experimental collections charted in FIGS. 8A, 8B, and 8C Western Europe and North America may mapped with a lower security risk prediction and Central Asia and Eastern Europe may be mapped with a higher security risk prediction corresponding to the respective decimals of FTP, HTTP, or WiFi™ nodes including weak credentials. Additional security risk predictions are mapped to additional geographic locations to build a security risk geographical map which represents risk level and risk type per location. Based on a risk event history compiled as collected security events, the security risk predictions are assigned per location for example as a risk level of 0 (zero) to 1 (one). The mapping of the first security risk prediction is stored for example in the map datastore 38 of the security manager 20.

Security risk predictions of certain geographic locations adjacent to a plurality of geographic locations can be mapped based on the security risk predictions of the plurality of geographic locations, for example certain geographic locations for which data is unavailable for rendering a security risk prediction including a risk level. The security agent 14 can determine the particular user device 12 is located at the certain geographic locations at respective certain times, and the security agent 14 can respectively activate certain security measures at the respective certain times based on the certain security risk predictions and based on the particular user device 12 being located at the certain geographic locations at the respective certain times.

Figure 6A:
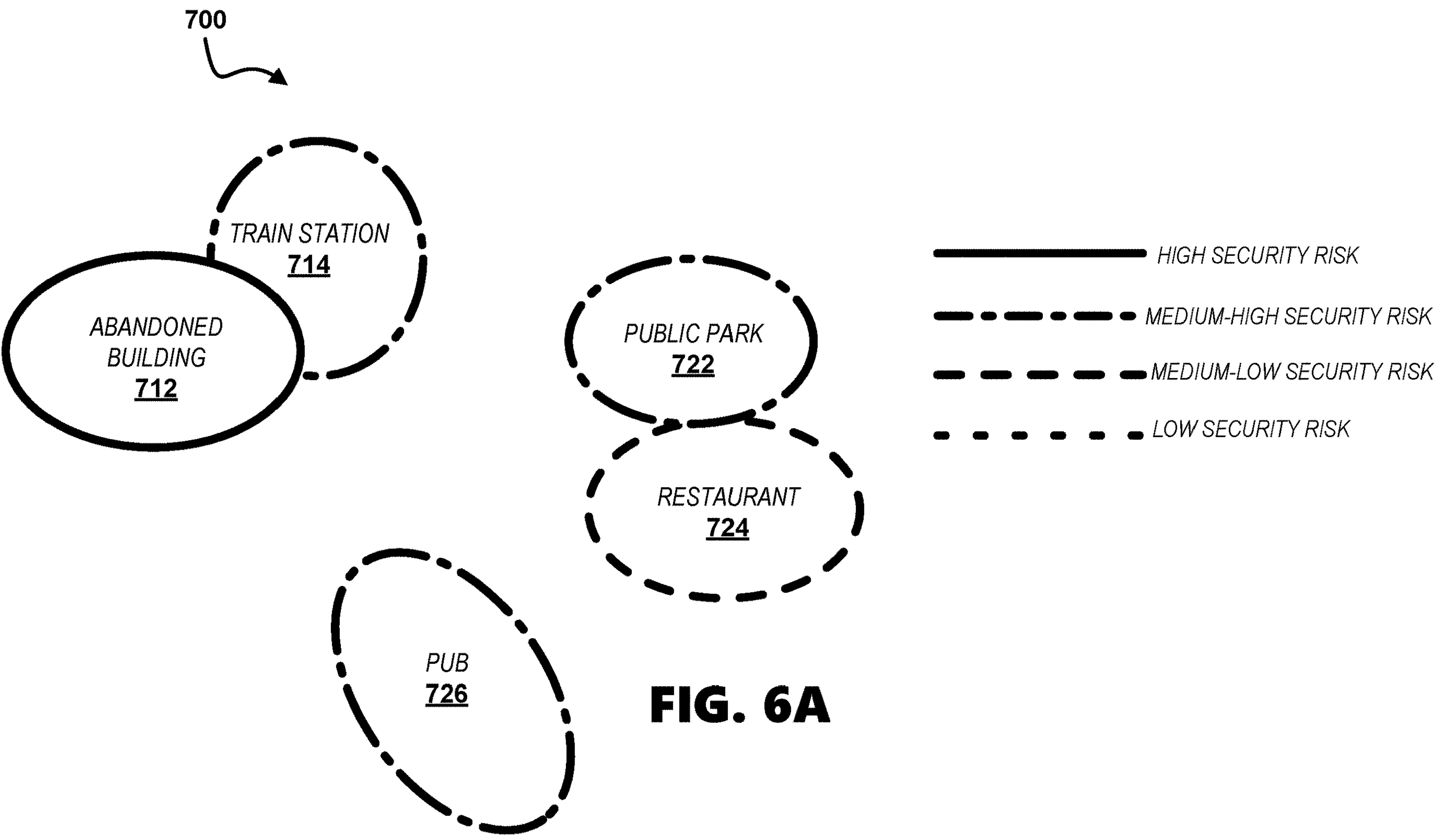
FIGS. 6D and 6E show exemplary displays including exemplary security risk maps generated according to described methods.

Security risk geographical maps can have different resolutions or grid area sizes. Grid areas can be defined for example as countries, cities, or neighborhoods or portions thereof. Alternatively, grid areas can be defined as points of interest as shown in the exemplary first, second, and third security risk maps 700, 702, 704 of FIGS. 6A, 6B, and 6C respectively. Grid areas can be identically sized as in the exemplary fourth security risk map 800 of FIG. 7 or irregular. A security risk geographical map can include for example a weighted combined map for multiple security risk types for example a summation of a severity of each risk type multiplied by the probability of each risk type. A security risk map can alternatively be descriptive of a particular security risk, for example a computer virus risk map, a computer hacking risk map, a computer eavesdropping risk map, a device theft risk map, a physical assault risk map, or a kidnapping risk map. Referring to FIG. 6A, points of interest in the exemplary first security risk map 700 include an abandoned building 712, a train station 714, a public park 722, a restaurant 724, and a pub 726, with security risk predictions determined as risk levels for example based on security event indications as collected in step 202 of the method 200.

Figure 6B:
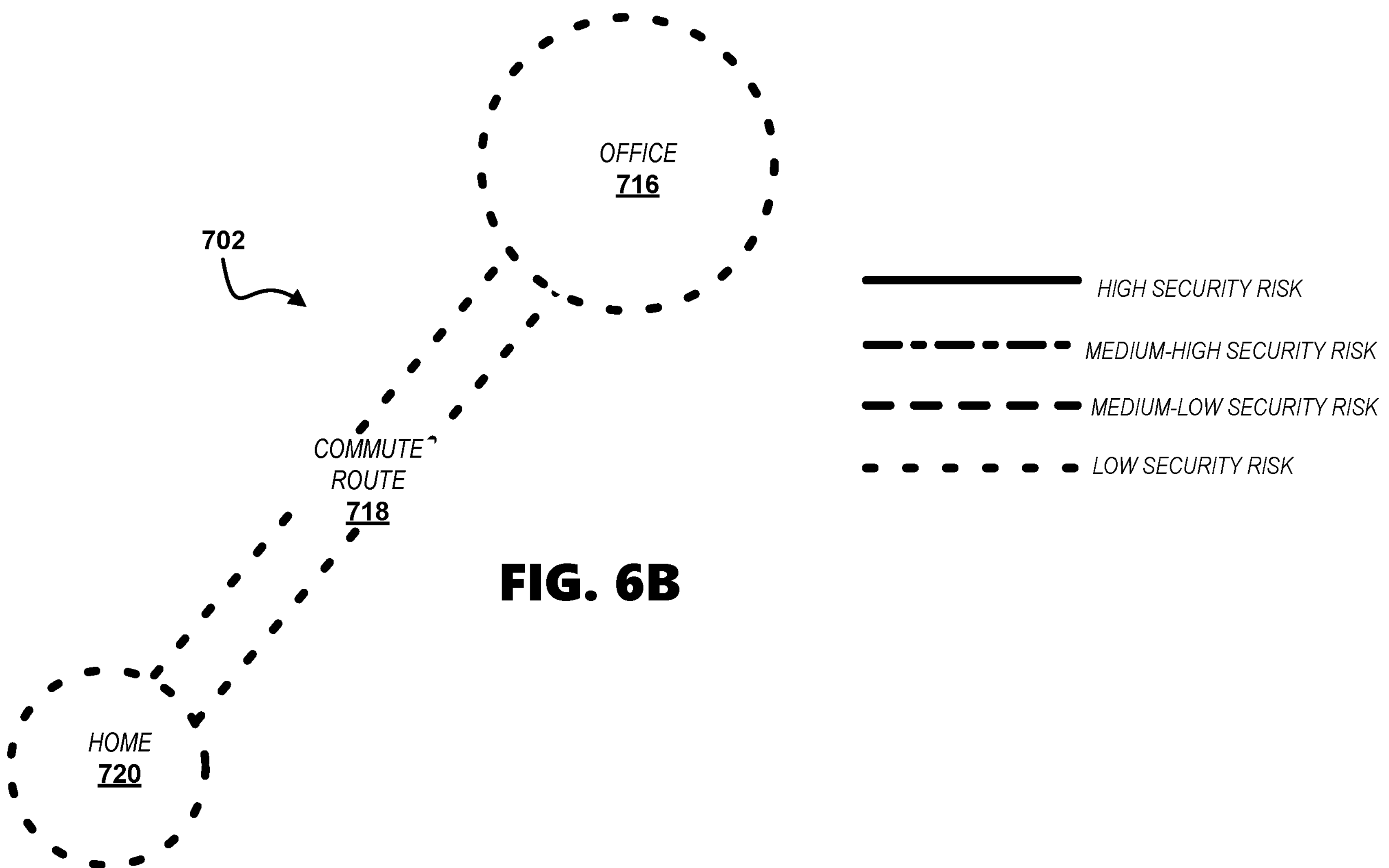

The security manager 20 is further configured to build a personal security risk geographical map for each user of a user device 12, which map represents a risk level and risk type per location for a particular user of a user device 12. Referring to FIG. 6B for example, points of interest in the exemplary second security risk map 702 represent a personal risk map and include areas corresponding to a particular user of a particular user device 12 including a home 720 of the particular user, an office 716 of the particular user, and a commute route 718 determined to be frequently taken by the particular user from the home 720 to the office 716. The points of interest are based on location data aggregated from the LDS 64 of the particular user device 12 of the particular user. The second security risk map 702 shows the office 716, the commute route 718, and the home 720 as determined to be low security risk areas for example based on security risk event indications as collected in step 202 of the method 200.

Figure 6C:
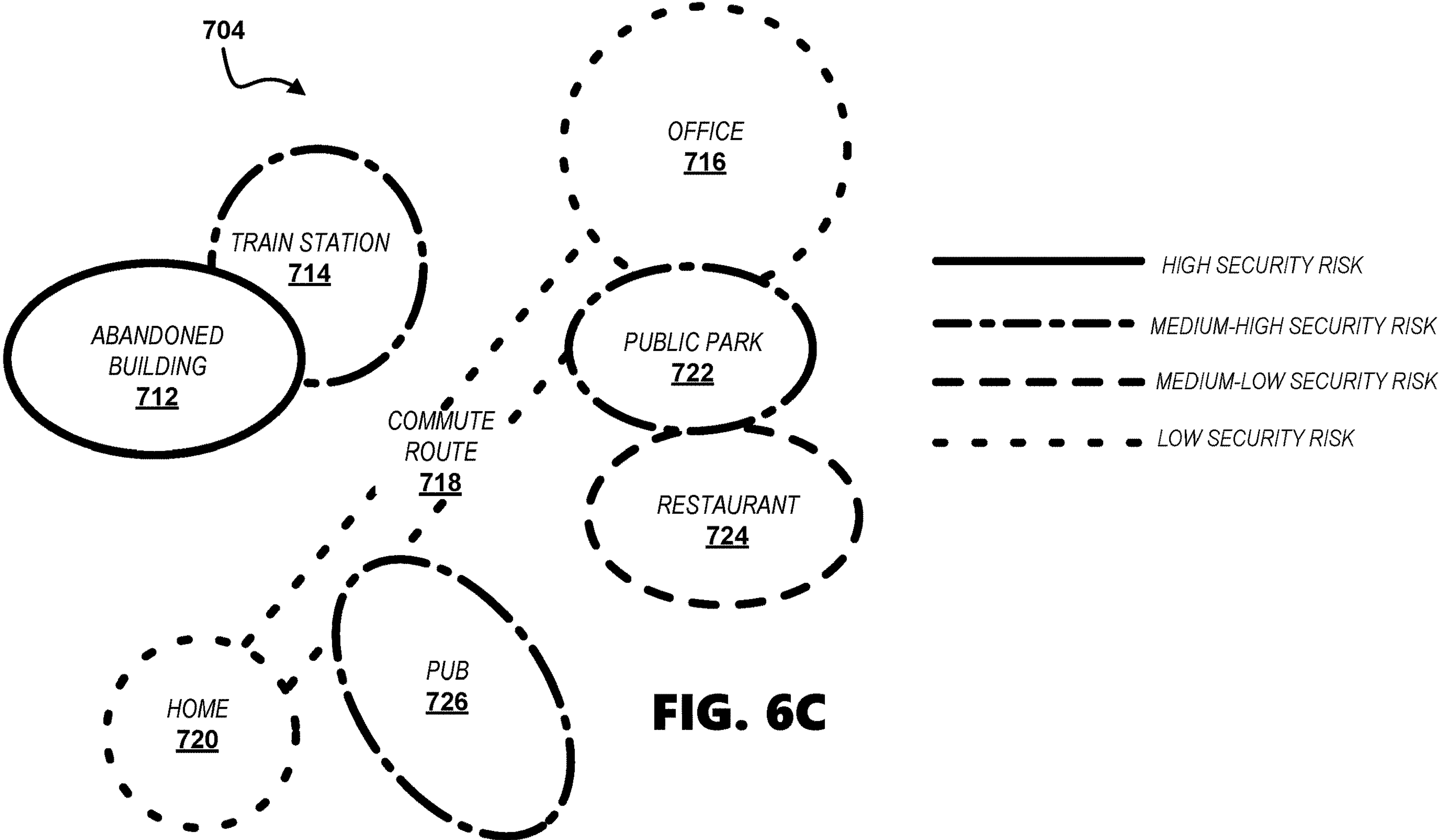

A personal risk map can be generated as a weighted combination of a risk level of a public risk map (e.g., based on cyber security history data of a plurality of user devices 12 or public direct security risk information) and a risk level based on personal risk event history. A user's personal risk event history including data security events on the user's user device 12 differentiates a personal risk map from a public risk map primarily at personal points of interest, for example a user's home or workplace. Other user information can differentiate a personal risk map from a public risk map, for example a type and quality of user device 12, user age, user physical defense capacity, user tendency to visit high risk geographic locations, user tendency to communicate with high risk computer network destinations, and user communication with or association by social media applications 52 with high risk personal contacts. Referring to FIG. 6C for example the exemplary third security risk map 704 represents a personal risk map including a composite of the points of interest in the first security risk map 700 and the second security risk map 702.

Figure 7:
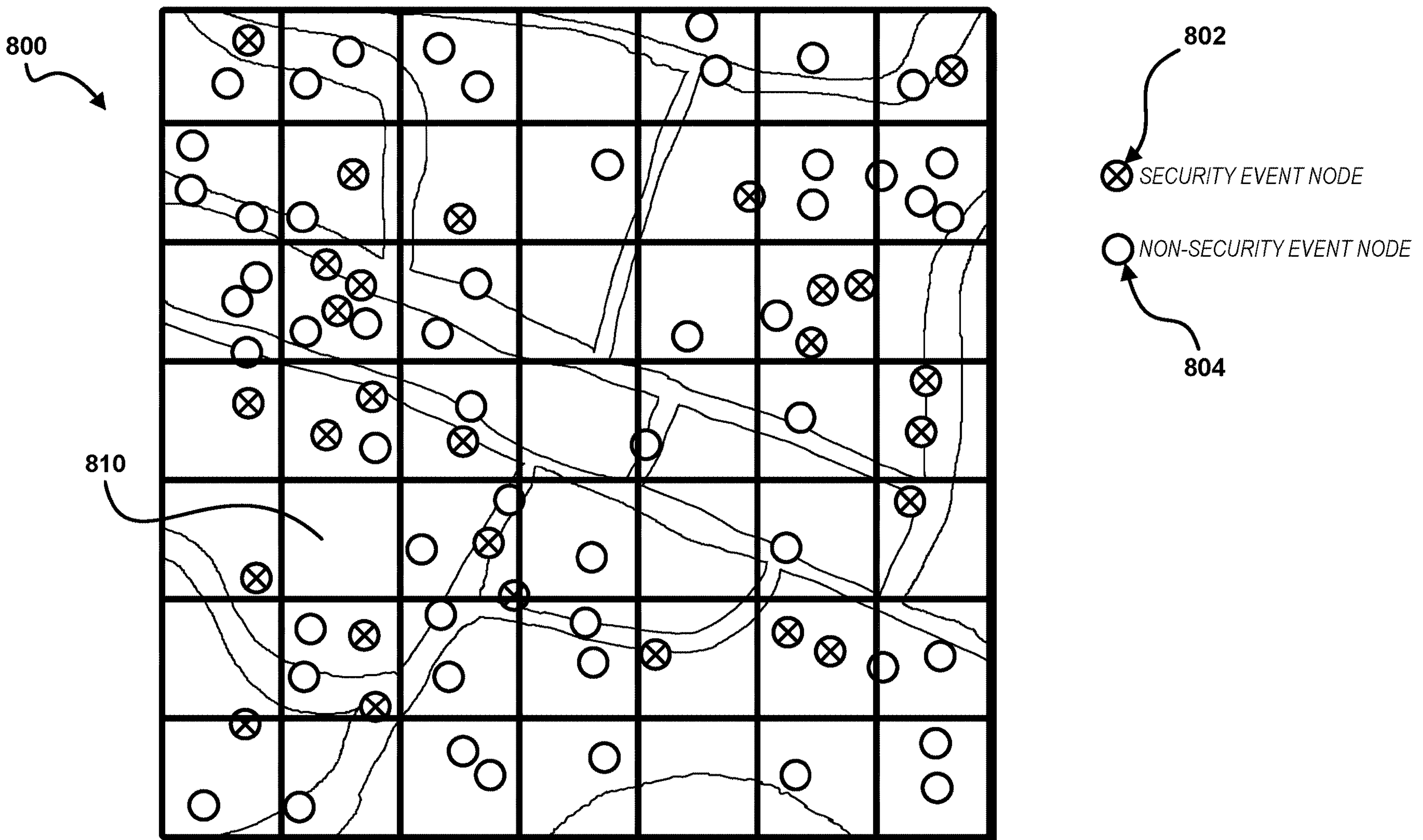
FIG. 7 shows an exemplary security risk map in which a geographic area is divided into square grid areas.

Referring to FIG. 7, the exemplary fourth security risk map 800 is shown in which a geographic area is divided into square grid areas. The number of security events are represented by the number of security event nodes 802 in each grid area, and can include for example nodes with weak FTP, HTTP, or wireless credentials, or threshold numbers of computer virus, hacking, or eavesdropping events. Alternatively, security events can include physical security events such as device thefts, physical assaults, and kidnappings for example based on data collected via external data APIs 90. Nodes not subject to a security event during a particular time frame are represented by non-security event nodes 804. The number of security event nodes 802 relative to the total number of nodes in a particular grid area is used to determine the predicted risk level for device users in the particular grid area. More security event nodes 802 relative to non-security event nodes 804 increases the risk level, as shown for example by the data charts 900, 910 and 920 of FIGS. 8A, 8B, and 8C respectively. Alternatively, the predicted risk level can be based on total security events relative to a particular baseline value without reference to security event nodes 802 or non-security event nodes 804, as would be the case for physical security events such as thefts, assaults, or kidnappings. For grid areas such as the box 810 where no event data is available, the risk level is beneficially interpolated from neighboring grid areas. Beneficially, a machine learning security risk predictor is trained based on indirect security risk/breach information (e.g., whether an area is residential or commercial, income level, housing prices, school ratings, and population density) to predict security risks for areas where only indirect security risk/breach information is available and no direct cyber security history data including data security events is available or no physical security data (e.g., physical crime data) is available. Suitable machine learning methods include for example logistic regression, decision tree, random forest, and artificial neural network. The classifier can output for example a probability of data security events (e.g., computer viruses, hacking or eavesdropping), a probability of physical security events (device theft, assault, kidnapping, or no crime), or combined crime probability (e.g., crime v. no crime).

Returning to the method 200, a particular user device 12 is determined to be located at the first geographic location (step 206), for example by the security agent 14 based on a determination by the LDS 64 of the particular user device 12 and mapping data retrieved from the map datastore 38 and stored locally in the security datastore 62. A first security measure is activated on the particular user device 12 by the security agent 14 based on the first security risk prediction of the first geographic location responsive to the particular user device 12 being located at the first geographic location (step 208). Beneficially, the user device 12 is determined to be located at the first geographic area at a particular time, and the first security measure is activated responsive to the particular user device 12 being located at the first geographic location at the particular time. Data specifying the first security measure is stored for example in the security datastore 62.

Figure 2B:
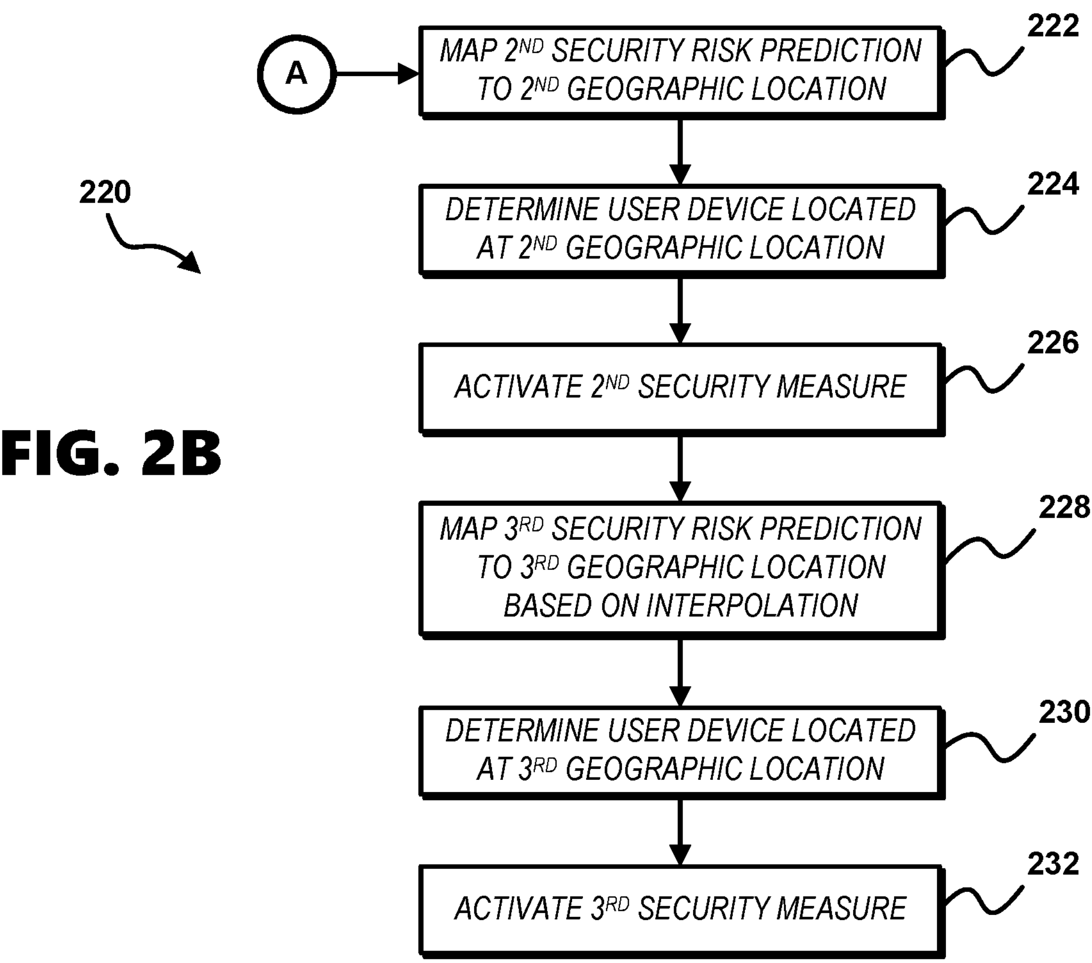

Referring to FIG. 2B, a method 220 describes a continuation of the method 200 from step "A". A second security risk prediction is mapped to a second geographic location of the geographic area based on the collected security events (step 222). The mapping of the second security risk prediction is stored for example in the map datastore 38 of the security manager 20. The particular user device 12 is determined to be located at the second geographic location (step 224), for example by the security agent 14 based on a determination by the LDS 64 and mapping data retrieved from the map datastore 38 and stored locally in the security datastore 62. A second security measure is activated on the particular user device based on the second security risk prediction of the second geographic location and based on the particular user device 12 being located at the second geographic location (step 226). A third security risk prediction is mapped to a third geographic location of the geographic area based on an interpolation of the first security risk prediction and the second security risk prediction (step 228). The particular user device 12 is determined to be located at the third geographic location (step 230), for example by the security agent 14 based on a determination by the LDS 64 and mapping data retrieved from the map datastore 38 and stored locally in the security datastore 62. A third security measure is activated on the particular user device 12 based on the third security risk prediction of the third geographic location and based on the particular user device 12 being located at the third geographic location (step 232). Data specifying the second and third security measures is stored for example in the security datastore 62.

The security manager 20 enables mapping of a plurality of security risk predictions, beneficially including security risk levels, respectively to a plurality of geographic locations in a particular geographic area based on the security events. The security agent 14 thereby enables determining the particular user device 12 is located at the plurality of geographic locations at different times and activates respectively a plurality of security measures at the respective different times based on the respective plurality of security risk predictions and based on the particular user device 12 being located at the plurality of geographic locations at the respective different times. In this manner the security measures implemented on the particular user device 12 match the security risk predictions of the geographic locations where the user device 12 is located at given times.

Figure 6D:
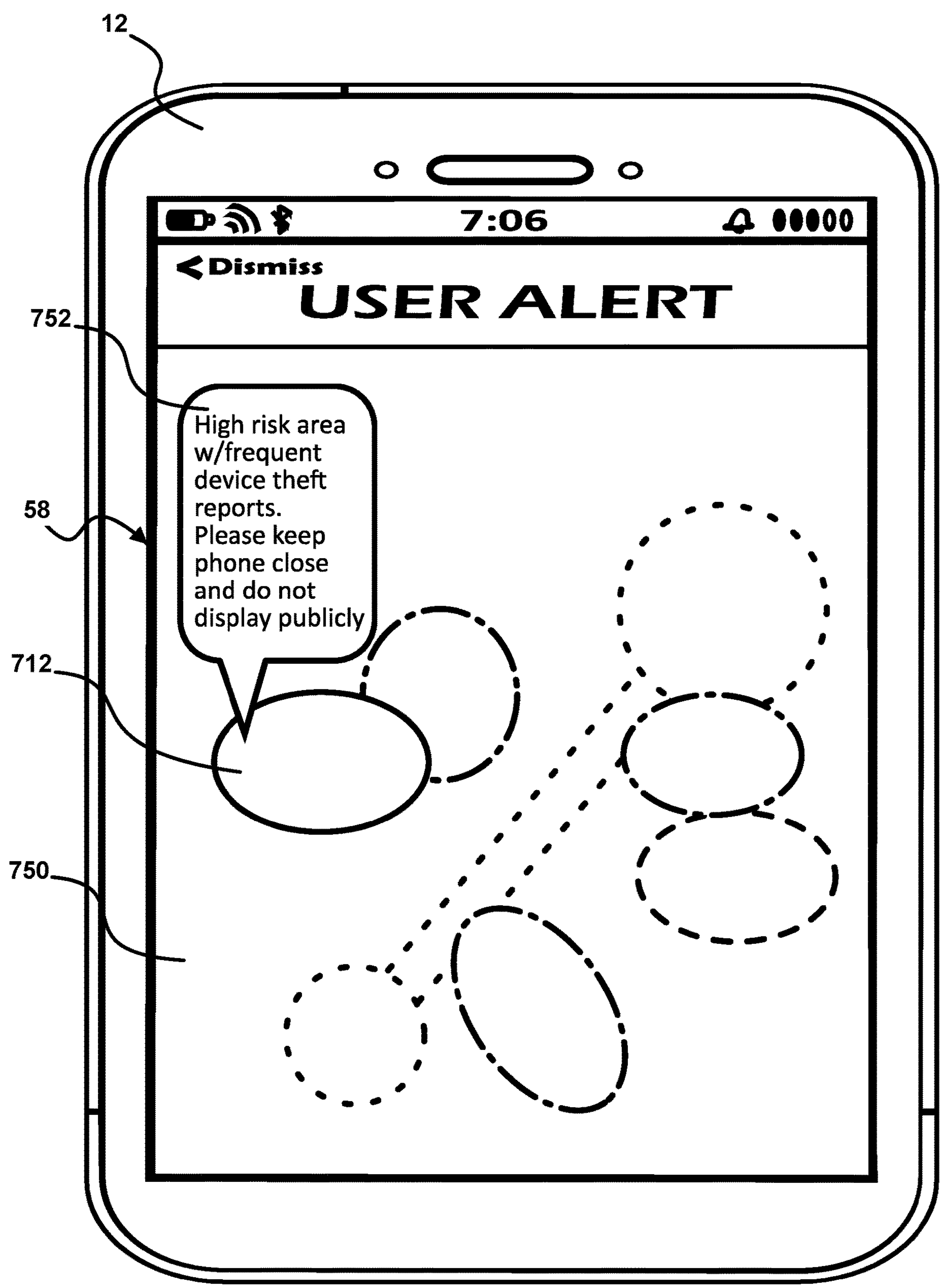

Beneficially a user of a user device 12 is informed of a security risk level at a determined location of the user device 12, for example by a map in a user interface 58 showing red for geographic areas where there is a high risk and showing green for geographic areas where there is a low risk. The user is further informed of likely security risk types at particular locations, for example "multiple phone thefts in the last two months", "occasional reports of physical assaults", or "two kidnapping cases reported". FIG. 6D shows a first exemplary map display 750 including a risk map displayed by the security agent 14 in the user interface 58 of a user device 12, the risk map including a first risk notification 752 corresponding to an abandoned building 712 where the user device 12 is located. Further, a message can be transmitted via a messaging application 50 of the user device 12 to another device indicating a security risk based on a current location of the user device 12, for example to a parent of a user of the user device 12.

Activating a security measure on the particular user device 12 as in the methods 200 and 220 can include activating a virtual private network ("VPN") through which the particular user device 12 connects to a wide area network ("WAN") or a local area network ("LAN"). Activating a security measure can alternatively include enabling one or more authentication protocols to enable a functional component of the particular user device 12.

Security protocol is adaptively configured by the security agent 14, beneficially via instructions in the security datastore 62 provided to the operating system 60, according to a risk level where the user device 12 is geographically located to maximize device security with the least inconvenience for a user of the user device 12. At a high risk geographic area such as an abandoned building, the security agent 14 enables a safe device mode. A safe device mode for example disables any sensitive traffic such as financial transactions and disables the showing of or resetting of passwords. A safe device mode can further require maximum login protection, for example requiring two or more of passcode entry, face recognition, fingerprint entry, and voice recognition with sentiment analysis for authentication. Voice and sensor sentiment analysis by the security agent 14 (e.g., enabled by an audio input apparatus of the user device 12) indicates stress level/sentiment, wherein if a high probability of user emotional or physical stress is determined, the security agent 14 enables an automated emergency/stress phone call or other network communication and enters the user device 12 into an emergency mode with highly restricted usability. At a medium risk area, for example public transit, the security agent 14 implements medium login protection, for example one of passcode entry, finger print entry, or face recognition. At a low risk or safe area, for example a user's place of work or home, the security agent 14 implements low security measures, for example allowing logins to applications, features, or network locations without passwords or allowing weak forms of authentication, for example preset hand gestures.

In a further extension of the methods 200 and 220, the security agent 14 can record by an audio input apparatus of the particular user device 12 voice of a particular user of the particular user device 12 and analyze the voice of the particular user for a stress indication. Activating a security measure on the particular user device 12 for example as in method steps 208, 226, and 232 can be further based on a determined stress indication.

VPN protocol is adaptively configured by the security agent 14 according to the risk level at each location to maximize cyber security with the least user inconvenience. At high risk areas, the security agent 14 beneficially implements a VPN or requires VPN use for all Internet connections or other network communications. At medium risk areas, the security agent 14 implements a VPN or requires VPN use for sensitive Internet connections or other sensitive network communications, for example financial transactions. At low risk or safe areas, the security agent 14 does not enable a VPN or does not require a VPN for Internet connections or other network communications.

The collecting of the indications of the security events in step 202 of the method 200 beneficially includes monitoring by the security agent 14 a plurality of data security events on a plurality of user devices 12 or routers 13 or other access points, the plurality of data security events including a first data security event occurring at the first geographic location of step 204 of the method 200. An extension of the method 200 can include for example monitoring a plurality of geographic locations of the plurality of user devices 12 in the geographic area, the plurality of geographic locations comprising the first geographic location, and mapping the first security risk prediction to the first geographic location of the geographic area based on the first data security event, the first security risk prediction including for example a risk level of the first geographic location. The plurality of data security events can include for example one or more of computer virus attacks, computer eavesdropping events, computer hacking events, or application of weak credentials. Particularly, the collecting of the indications of the security events in step 202 of the method 200 can include collecting virus detection logs, eavesdropping logs, hacking logs, or credential logs from a plurality of user devices 12 or routers 13 or other access points, and collecting a plurality of geographic locations of the logged viruses, eavesdropping events, hacking events, or indications of weak credentials on the plurality of user devices 12 or routers 13 or other access points. Alternatively, the collecting of the indications of security events can include collecting freeze events initiated by a carrier system on a plurality of user devices 12 or collecting initiations of a device tracking application on the plurality of user devices 12, and collecting a plurality of geographic locations of the freeze events or the initiations of the device tracking application.

The collecting of the indications of the security events in step 202 of the method 200 can further include collecting crime information by the security manager 20 for example via an external data API 90. The method 200 can further include for example mapping the first security risk prediction to the first geographic location of step 204 further based on the collected crime information. In a further extension of the method 200, monitored data security events can further include a second data security event occurring at the second geographic location of the geographic area. The method 200 can further include for example mapping a second security risk prediction (e.g., a risk level) to the second geographic location of the geographic area based on the crime information and the second data security event, and activating a second security measure on the particular user device 12 based on the second security risk prediction of the second geographic location and based on the particular user device 12 being located at the second geographic location.

In a further extension of the method 200 it is determined that the particular user device 12 is positioned at the first geographic location during a plurality of time periods. The mapping engine 34 makes a determination that the first geographic location is a first point of interest based on the determining that the particular user device 12 is positioned at the first geographic location during the plurality of time periods. The point of interest for example can be determined to be a home, an office, or a workplace of the user of the particular user device 12. The first security measure of step 208 of the method 200 can be activated by the security agent 14 on the particular user device 12 further based on the determining that the first geographic location is the first point of interest of the user of the particular user device 12.

In a further extension of the methods 200 and 220, the security manager 20 can receive, for example via queries initiated by the security agent 14 to the particular user or queries to APIs of social media applications 52, age information, physical defense capacity information, and social networking history of the particular user of the user device 12. Security measures activated by the security agent 14 for example in steps 208, 226, and 232 can be further based on one or more of the age information, physical defense capacity, or social networking history of the particular user.

In a further extension of the methods 200 and 220, the security manager 20 can determine a plurality of demographic information of the plurality of geographic locations, determine particular demographic information of the first geographic location, and map the first security risk prediction further based on the plurality of demographic information and the particular demographic information. For example, the classifier engine 22 can train one or more classifiers based on the plurality of demographic information and the security events, and the classifier engine 22 can apply the one or more classifiers to the particular demographic information to map the first security risk prediction. In like manner, the security manager 20 can determine other demographic information of respective other geographic locations, and the security manager 20 can respectively map other security risk predictions to the other locations based on the plurality of demographic information and the respective other demographic information. Mapping a security risk prediction (e.g., a risk level) based on demographic information may be useful for locations where no security event data is available.

Indications of the security risk predictions are beneficially provided by the security agent 14 to a user of the particular user device 12 via the user interface 58. Alternatively, an indication of a security risk prediction can be transmitted by the security agent 14 or security manager 20 to another user, for example via the network 8 to a user with supervisory responsibility over the user of the particular user device 12, such as a parent or guardian.

Figure 3:
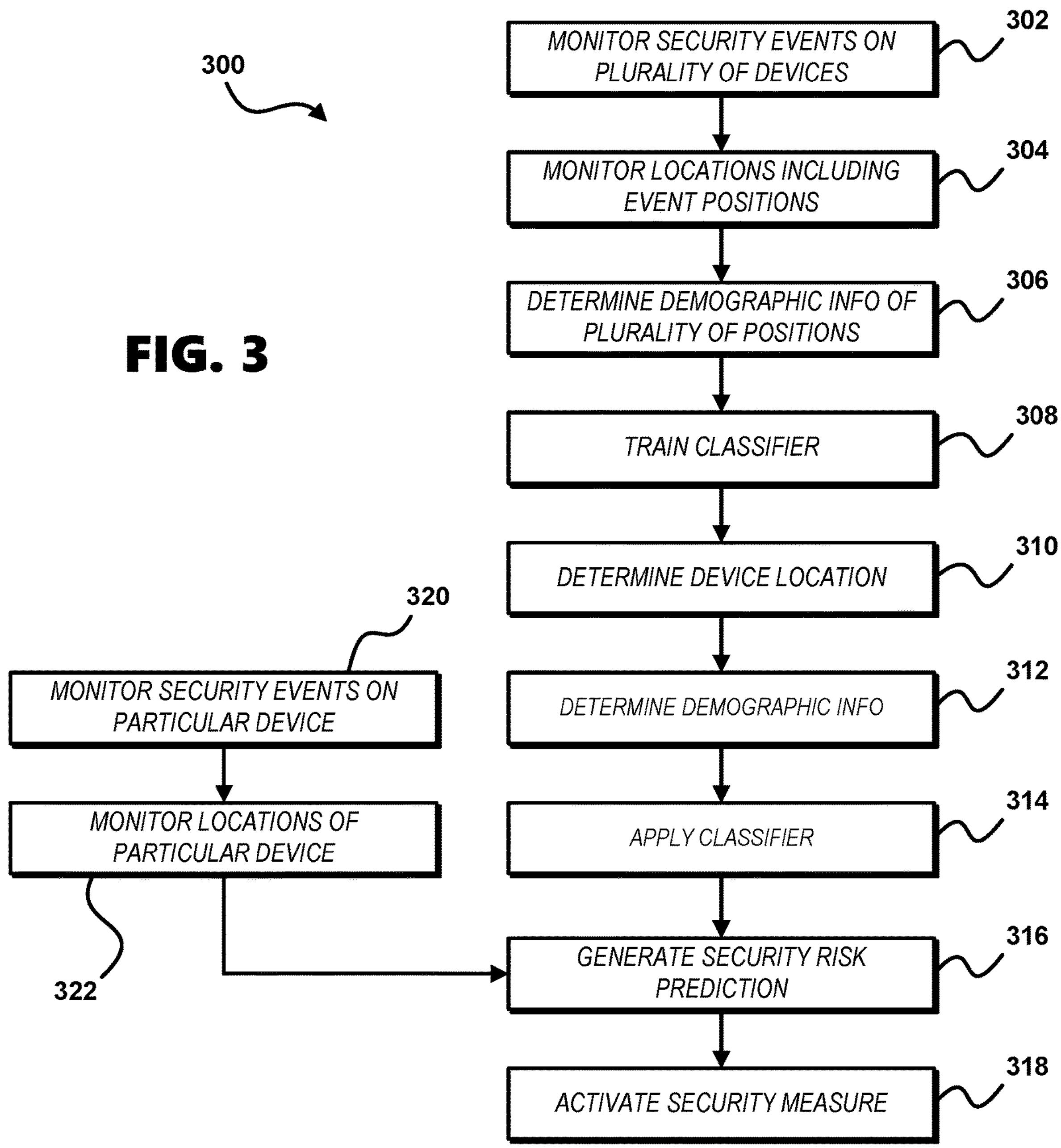

Referring to FIG. 3, a flowchart shows a method 300 of controlling use of network-connectable devices. The method 300 and associated processes are described with reference to the components of the system 10 shown in FIG. 1, including the user device 12, router 13, the processor-enabled security manager 20, and the security agent 14. Alternatively, the method 300 can be performed via other suitable systems.

In a step 302, the security manager 20 via the security agents 14 on a plurality of user devices 12 monitors a plurality of data security events on the plurality of user devices 12. Monitoring the data security events can include for example monitoring computer virus attacks on the plurality of user devices 12, monitoring credentials used by the plurality of user devices 12 for network communicating, and monitoring passwords input by users of the plurality of user devices 12 used for network communicating. Monitoring the data security events can further include monitoring of freeze events initiated by a telecommunication carrier system on the plurality of user devices 12 and monitoring of an initiation of a device tracking application on the plurality of user devices 12, for example a device tracking application initiated by a device user when the user device 12 is lost or stolen. Collecting logs of freeze events and device tracking application activity may be indicative of the likelihood of user device theft activity.

The security manager 20 via the security agents 14 on the plurality of user devices 12 further monitors a plurality of geographic locations of the plurality of user devices 12, the plurality of geographic locations including a plurality of respective geographic positions of the plurality of user devices 12 when the plurality of data security events occurred (step 304). Indications of the data security events and the geographic positions are stored in the user datastore 26. The security manager 20 determines a plurality of demographic information of the plurality of geographic positions (step 306). The security manager 20 via the security agent 14 beneficially further determines the times when each of the plurality of data security events occurred. The demographic information can be gathered from an external data API 90 enabled by a network-accessible data repository (e.g., a public government data repository) via the external data interface 28 of the security manager 20, and stored in the demographics datastore 36. The determining of the plurality of demographic information can include for example determining one or more of an indication of a residential area, an indication of a commercial area, a population density, an indication of property values, an indication of income level or distribution, or an indication of school ratings. The security manager 20 can further determine a plurality of criminal statistical data of the plurality of geographic positions. Criminal statistical data can include for example location-specific indications of device thefts, physical assaults, and kidnappings. The criminal statistical data can be gathered via the external data interface 28 from an external data API 90 or other API enabled by a network-accessible data repository. The criminal statistical data can be stored in the external data datastore 40.

One or more classifiers are trained based on the plurality of data security events and the plurality of plurality of demographic information (step 308). The classifier engine 22 beneficially performs the training of a machine learning classifier based on data stored in the user datastore 26 and the demographics datastore 36, and generates classifier data based on the training which is stored in the classifier datastore 24. The training can include for example training one or more of an artificial neural network classifier, a logistic regression classifier, a decision tree classifier, or a random forest classifier. The one or more classifiers can include for example one or more artificial neural network classifiers which are trained by providing the plurality of demographic information as an input to the one or more classifiers and providing the plurality of data security events as an output to the one or more classifiers and applying backpropagation. Beneficially the plurality of times when the plurality of data security events occurred are also provided as an input to the one or more classifiers. The one or more classifiers can be further trained based on the criminal statistics data of the plurality of geographic positions. Examples of such classifiers in the form of artificial neural networks 400, 500, and 600 are described herein with reference to FIGS. 4A, 4B, and 4C.

In a step 310, a security agent 14 on a particular user device 12 determines that the particular user device 12 is located at a particular geographic location. The security agent 14 beneficially further determines a particular time the particular user device 12 is located at the particular geographic location. The security agent 14 can enable the LDS 64, such as a GPS including a GPS receiver, to determine the particular geographic location. Alternatively, a mapping engine 34 of the security manager 20 can determine location of the particular user device 12 based on data received from a telecommunication carrier system via a telecommunication carrier application program interface ("API") 80 or via data received from the particular user device 12 via a security application program interface ("API") 30 in communication with the security agent 14.

In a step 312, particular demographic information of the particular geographic location is determined. Beneficially the mapping engine 34 of the security manager 20 determines demographic information from data in the demographics datastore 36 or by querying one or more external data APIs 90. Alternatively, the security agent 14 on the particular user device 12 can query the demographic datastore 36 via the security API 30 to determine the particular demographic information.

The trained one or more classifiers are applied to the particular demographic information (step 314), and a particular security risk prediction of the particular geographic location is generated based on the applying of the one or more classifiers (step 316). Beneficially, the trained one or more classifiers are further applied to the particular time at which the particular user device 12 is located at the particular geographic location in generating the particular security risk prediction. The one or more classifiers are beneficially applied by the security agent 14 or the classifier engine 22 to the particular demographic information from the demographic datastore 36 and to the particular time. The particular time indicates a slice of time during which the particular user device 12 is located at the particular geographic location and beneficially includes a start time and an end time based on one or more time stamps generated by the LDS 64. Generating the particular security risk prediction can include determining a probability of an occurrence of one or more data security events. Generating the particular security risk prediction can further include determining a severity of the one or more data security events. Generating the particular security risk prediction can further include predicting a probability of a criminal event and a severity of the criminal event. Moreover, the particular security risk prediction can include a security risk level for example on a scale from zero (0) to one (1).

The method 300 can further include monitoring certain data security events on the particular user device 12 (step 320), and monitoring certain geographic locations of the particular user device 12 including certain geographic positions of the particular user device 12 when the certain data security events respectively occurred on the particular user device 12 (step 322). In such case the particular security risk prediction of the particular geographic location is generated in step 316 further based on the certain data security events and the certain geographic positions of the particular use device 12. For example, a personal risk prediction can be mapped as a weighted combination of a risk level of a public risk map (e.g., based on cyber security history data of a plurality of user devices 12 or public direct security risk information) and a risk level based on personal risk event history.

A particular security measure is activated on the particular user device 12 based on the particular security risk prediction (step 318), for example a determined risk level on a particular scale. More specifically, the particular security measure can be activated based on the probability of one or more data security events and the severity of the one or more data security events. The particular security measure can be activated further based on the probability of a criminal event and the severity of the criminal event. The security agent 14 can activate the particular security measure on the user device 12 based on the particular security risk prediction, the particular security measure including for example disabling particular network traffic or enabling one or more particular authentication protocols on the user device 12 such as to authorize one or more functional components of the user device 12 or authorize access to a network resource. The one or more particular authentication protocols can include for example passcode authentication, voice recognition authentication, face recognition authentication, or fingerprint authentication. Activating the particular security measure can alternatively include activating a virtual private network ("VPN") through which the particular user device 12 connects to a local area network ("LAN") or a wide area network ("WAN"). In such manner security protocols implementing particular security measures are adaptively configured according to the security risk prediction of a particular location so as to maximize a level of security with the least amount of inconvenience to a user of the user device 12.

In an example implementation of the method 300, at a geographic location of an area corresponding to a high security risk prediction for example a geographic location in an area in which monitored data security events or criminal statistical data indicates a high security risk (e.g., an abandoned building), the security agent 14 can enable a safe device mode. A safe device mode can implement security measures including for example disabling any sensitive network traffic such as financial transactions, disabling the showing of passwords on a user interface 58 of the user device 12, and disabling the ability to reset or change a password used on the user device 12. A safe device mode can further require two or more authentication protocols to afford maximum login protection, for example two or more of passcode authentication, face recognition authentication, fingerprint authentication, voice recognition authentication, and sentiment analysis authentication. Voice and sensor sentiment analysis is enabled on the security agent 14 which can indicate a stress level or a sentiment of a user of the user device 12 based on audio received via an audio input apparatus of the user device 12, such as the audio input apparatus 1013 of the exemplary computer system 1000 described herein with reference to FIG. 9. If a sentiment analysis determines a high probability of physical stress in a safe device mode, the security agent 14 restricts communications to emergency communications (e.g., emergency or distress voice communications or electronic text communications) and enters into an emergency mode.

At a geographic location of an area corresponding to a medium security risk prediction for example a geographic location in an area in which monitored data security events or criminal statistical data indicates a medium security risk (e.g., public transit), the security agent 14 can enable a medium security device mode. A medium security device mode can implement less stringent security measures including for example one of passcode authentication, face recognition authentication, or fingerprint authentication to enable a functional component of the user device 12 or other resources. At a geographic location of an area corresponding to a low security risk prediction, for example a geographic location in an area in which monitored data security events or criminal statistical data indicates a low security risk (e.g., an office building), the security agent 14 can enable a low security device mode. A low security device mode can implement even less stringent security measures including for example a preset hand gesture authentication detectable on the user interface 58 of the user device 12 to enable a functional component of the user device 12 or other resource. Alternatively, functional components of the user device 12 or other resources can be enabled without any authentication when a low security risk prediction is determined.

In an example implementation of the method 300, different VPI activation procedures are activated depending on the predicted security risk of the location of the user device 12. For example, a VPN can be automatically, activated for all Internet connections or all network communications by the security agent 14 when a user device 12 is located at a geographic location corresponding to a high security risk prediction, for example a geographic location in an area in which monitored data security events or criminal statistical data indicates a high security risk. When a user device 12 is located at a geographic location corresponding to a medium security risk prediction, for example a geographic location in an area in which monitored data security events or criminal statistical data indicates a medium security risk, the security agent 14 can initiate a VPN for sensitive Internet traffic or other network traffic designated as sensitive, for example financial transactions. When a user device 12 is located at a geographic location corresponding to a low security risk prediction for example a geographic location in an area in which monitored data security events or criminal statistical data indicates a low security risk, the security agent 14 can permit network traffic to and from the user device 12 without initiating a VPN.

Figure 5C:
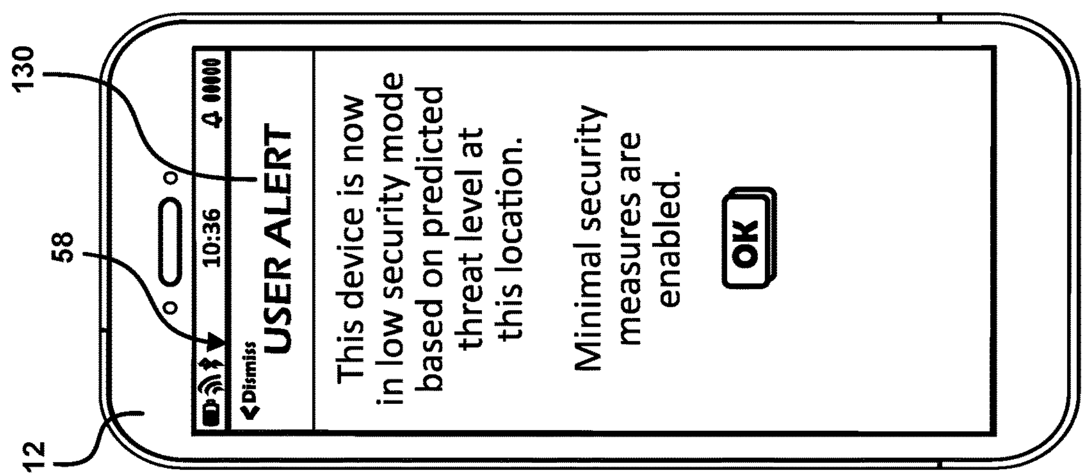
Figure 5B:
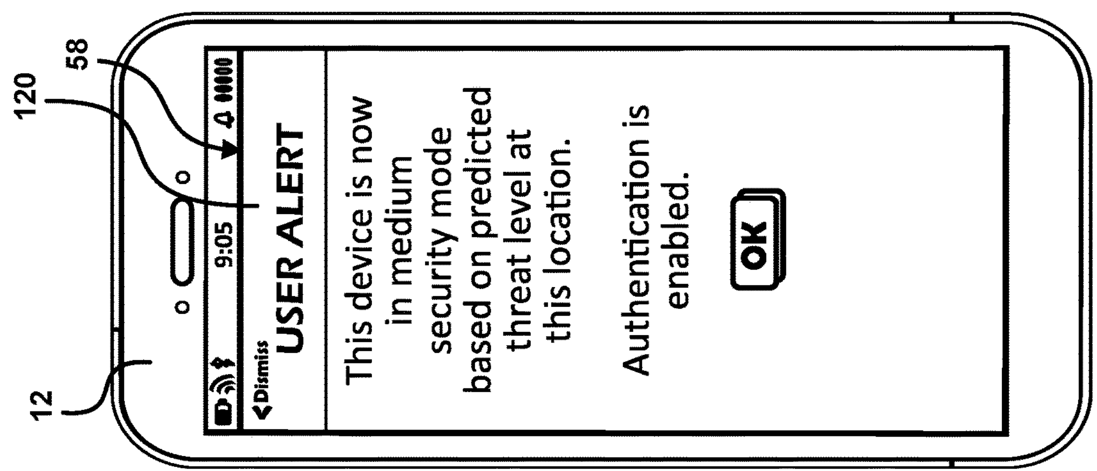
Figure 5A:
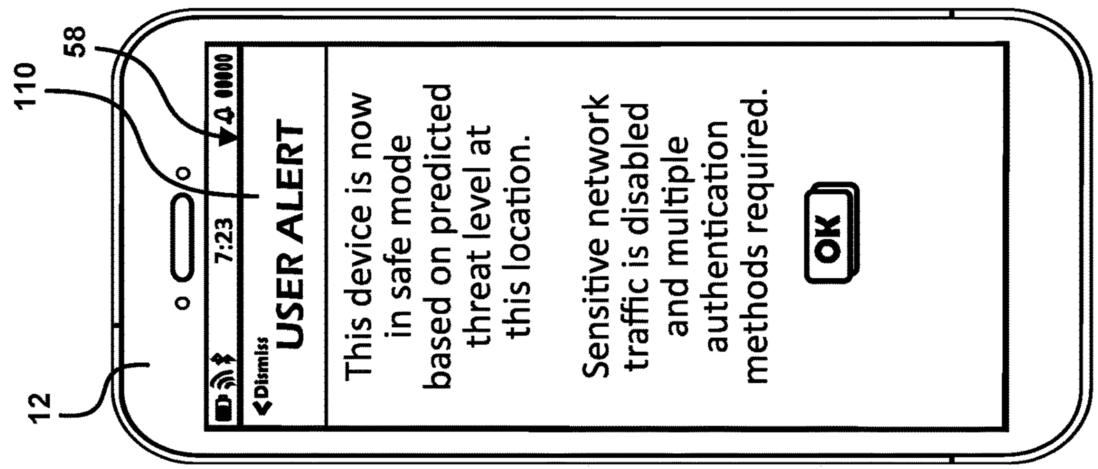

The security agent 14 further generates an alert on the user device 12 based on the particular security risk prediction for example a risk level of the particular geographic location. Referring to FIGS. 5A, 5B, and 5C, the security agent 14 via the user interface 58 enables interactive displays such as example interactive displays 110, 120, and 130 for providing alerts and permitting feedback to the security manager 20 by a user of the user device 12. A first example interactive display 110 is generated in response to generating a high security risk prediction, a second example interactive display 120 is generated in response to generating a medium security risk prediction, and a third example interactive display 130 is generated in response to generating a low security risk prediction. The first example interactive display 110 indicates that the user device 12 is in "safe mode", and that "sensitive network traffic is disabled and multiple authentication methods [are] required". The second example interactive display 120 indicates that the user device 12 is in "medium security mode", and that "authentication is enabled". The third example interactive display 130 indicates that the user device 12 is in "low security mode", and that "minimal security measures are enabled".

The one or more classifiers can be applied as in step 314 of the method 300 by the classifier engine 22 or the security agent 14 to multiple demographic information of multiple geographic locations to generate a first security risk map via the mapping engine 34, which map is stored in the map datastore 38. The first security risk map can be generated alternatively or further based on actual data security events and crime statistics when available for mapped geographic locations. The multiple geographic locations include for example the particular geographic location of step 310 above, and the first security risk map includes for example multiple security risk predictions in a particular geographic area defined by the multiple geographic locations. When the particular user device 12 is determined to be located at another geographic location on the security risk map including another security risk prediction, another security measure is activated based on the another security risk prediction. Further, a second security risk map is beneficially generated based on the certain data security events monitored on the particular user device 12 described above in step 320, and the monitoring of the certain geographic locations of the particular user device 12 described above in step 322. A third security risk map can be generated based on the first security risk map and the second security risk map, the third security risk map being a composite of the first security risk map and the second security risk map, and including for example additional security risk predictions in a composite geographic area defined by the multiple geographic locations and the certain geographic locations. Different security measures are activated when the particular user device 12 is located at different geographic locations based on the additional security risk predictions.

The first security risk map can be considered a public security risk map as it represents aggregated risk based on the detected plurality of data security events on the plurality of user devices 12. The second security risk map can be considered a personal security risk map as it represents individual risk based on use of a particular user device 12 by a particular user. The third security risk map can also be considered a personal security risk map as it represents the aggregated risk level/type per location as determined based on the detected plurality of data security events on a plurality of user devices 12 and based on individual use of a particular user device 12 by a particular user.

A personal security risk map is beneficially generated as a weighted combination of a pubic risk level determined based on security event data history of a plurality of user devices 12 and a personal risk level based on security event data history of a particular user device 12 of a particular user for whom the personal security risk map is generated. A particular user's personal security risk map derived from security event history differentiates from a public security risk map at personal points of interest such as a home or workplace (e.g., office) of the particular user. A personal security risk map can also differentiate from a public security risk map based on the particular user's type of user device 12 (e.g., secure or insecure, old or new), age of the particular user, physical defense capacity of the particular user (e.g., body type), history of geographic locations visited by the particular user corresponding to high security risk, and associations with other users (e.g., via social media applications 52) corresponding to high predicted security risks. In an example implementation further to the method 300, the security manager 20 receives via the security agent 14 an indication of an age and body type of a particular user of the particular user device 12 and generates the particular security risk prediction of the particular geographic location further based on one or both of the age or the body type of the particular user.

A security risk map can be configured with different resolutions or grid sizes. For example a security risk map can define security risk by country, by city, by neighborhood, or by point of interest. Referring to FIGS. 6A, 6B, and 6C respectively, the exemplary first security risk map 700, second security risk map 702, and third security risk map 704 defining security risks by points of interest are shown. Points of interest in the first security risk map 700 include an abandoned building 712, a train station 714, a public park 722, a restaurant 724, and a pub 726, with security risk predictions determined as risk levels for example by application of one or more classifiers as in step 314 of the method 300. Based on monitoring steps 320 and 322 of the method 300, and optionally further based on application of the classifier in step 316, points of interest are determined in the second security risk map 702. The second security risk map 702 represents a personal security risk map. The points of interest in the second security risk map 702 include areas corresponding to a particular user of a particular user device 12 including a home 720 of the particular user, an office 716 of the particular user, and a commute route 718 determined to be frequently taken by the particular user from the home 720 to the office 716 based on location data aggregated from the LDS 64 of the particular user device 12 of the particular user.

Based for example on the application of the one or more classifiers or alternatively or further based on actual data security events or crime statistics available for mapped geographic locations, the first security risk map 700 shows the abandoned building 712 as determined to be a high security risk area. The first security risk map 700 shows the train station 714, the public park 722, and the pub 726 as determined to be medium-high security risk areas. The first security risk map 700 shows the restaurant 724 as determined to be a medium-low security risk area. The second security risk map 702 shows the office 716, the commute route 718, and the home 720 as determined to be low security risk areas. Data defining the first and second security risk maps 700, 702 is stored in one or both of the user datastore 26 and the map datastore 38. The security agent 14 of the user device 12 will enable different security modes corresponding to different security measures depending on whether the user device 12 is located in the low security risk area, medium-low security risk area, medium-high security risk area, or high security risk area.

The third security risk map 704 includes a composite of the points of interest in the first security risk map 700 and the second security risk map 702 and as such also represents a personal security map. Areas where two points of interest overlap are beneficially subject to the security mode and corresponding security measures of the point of interest determined to have a higher predicted security risk. Alternatively, where two points of interest overlap the user device 12 can be made subject to the security mode and corresponding security measures of the point of interest determined to have a lower predicted security risk, or a composite of security measures of both overlapping points of interest, especially in the case where the lower predicted point of interest is derived from the monitoring steps 320 and 322 of the method 300, for example in the case of the home 720 of the particular user, the office 716 of the particular user, and the commute route 718 of the particular user.

A personalized security risk map of the type shown in FIG. 6C can be displayed by the security agent 14 in a user interface 58 of a user device 12 when the user device 12 is determined to be located at or near one or more points of interest defined in the risk map. Colors are beneficially used to show a risk level of a point of interest. Referring to FIG. 6C for example, points of interest determined to be high security risks are shown in red, medium-high security risks are shown in orange, medium-low security risks are shown in yellow, and low security risks are shown in green. A risk map can provide an indication of one particular security risk prediction in a particular geographic area (e.g., one of a computer virus attack risk level, computer eavesdropping risk level, physical theft risk level, physical assault risk level, or kidnapping risk level). Alternatively, a risk map can provide a security risk prediction as a weighted combination of two or more security risks. For example referring to Equation 1 below, a security risk prediction can be determined as the sum of the products of risk severity $R_{sev}$ and risk probability $R_{prob}$ over two or more types of risk i. Exemplary values for risk severity $R_{sev}$ are shown in Table 1. Values for risk probability $R_{prob}$ can include normalized outputs of one or more classifiers, for example outputs of the first, second, or third artificial neural networks 400, 500, 600 described with reference to FIGS. 4A, 4B, and 4C. Values for risk probability $R_{prob}$ can alternatively be based on actual security events such as data security events (e.g., virus attacks, computer hackings, computer eavesdroppings, or indications of weak credentials) or physical security events (e.g., device thefts, physical assaults, or kidnappings) in a particular geographic area.

$$\text{Security Risk Prediction} = \sum_{i=1}^{n} R_{sev} R_{prob} \qquad \text{Eq. 1}$$

TABLE 1

| Type of Risk (i) | Risk Severity ($R_{sev}$) |
|---|---|
| Computer virus attack | 1 |
| Computer hacking | 1 |
| Computer eavesdropping | 1 |
| Weak credentials | 1 |
| Device theft | 2 |
| Physical assault | 3 |
| Physical kidnapping | 5 |

When a security risk map is displayed by a user interface 58 of a user device 12, a notice describing one or more particular security risks, for example a predicted security risk level or an indication of actual events which have occurred, is beneficially displayed. Referring to FIG. 6D, the first exemplary map display 750 including a risk map of the type shown in FIG. 6C is displayed by the security agent 14 in the user interface 58 of a user device 12 when the user device 12 is determined to be located at or near an abandoned building 712 point of interest corresponding to frequent actual device theft reports. A first risk notification 752 indicates the abandoned building 712 is a "[h]igh risk area [with] frequent device theft reports", and that the user "[p]lease keep phone close and do not display publicly". The abandoned building 712 point of interest is shown in red to indicate a high security risk. Other points of interest in the first exemplary map display 750 corresponding to high security risks can also be shown in red, medium-high security risks can be shown in orange, medium-low security risks can be shown in yellow, and low security risks can be shown in green. Other exemplary notifications for particular points of interest can include "multiple phone thefts occurred in the last two months", "occasional reports of physical assaults", and "two kidnapping cases reported". The notifications and corresponding risk maps can further be sent to other users on other devices, for example to a parent of a user of a user device 12 on which the security agent 14 is executed, if the user device 12 is located at or near a location corresponding to a high security risk.

Figure 6E:
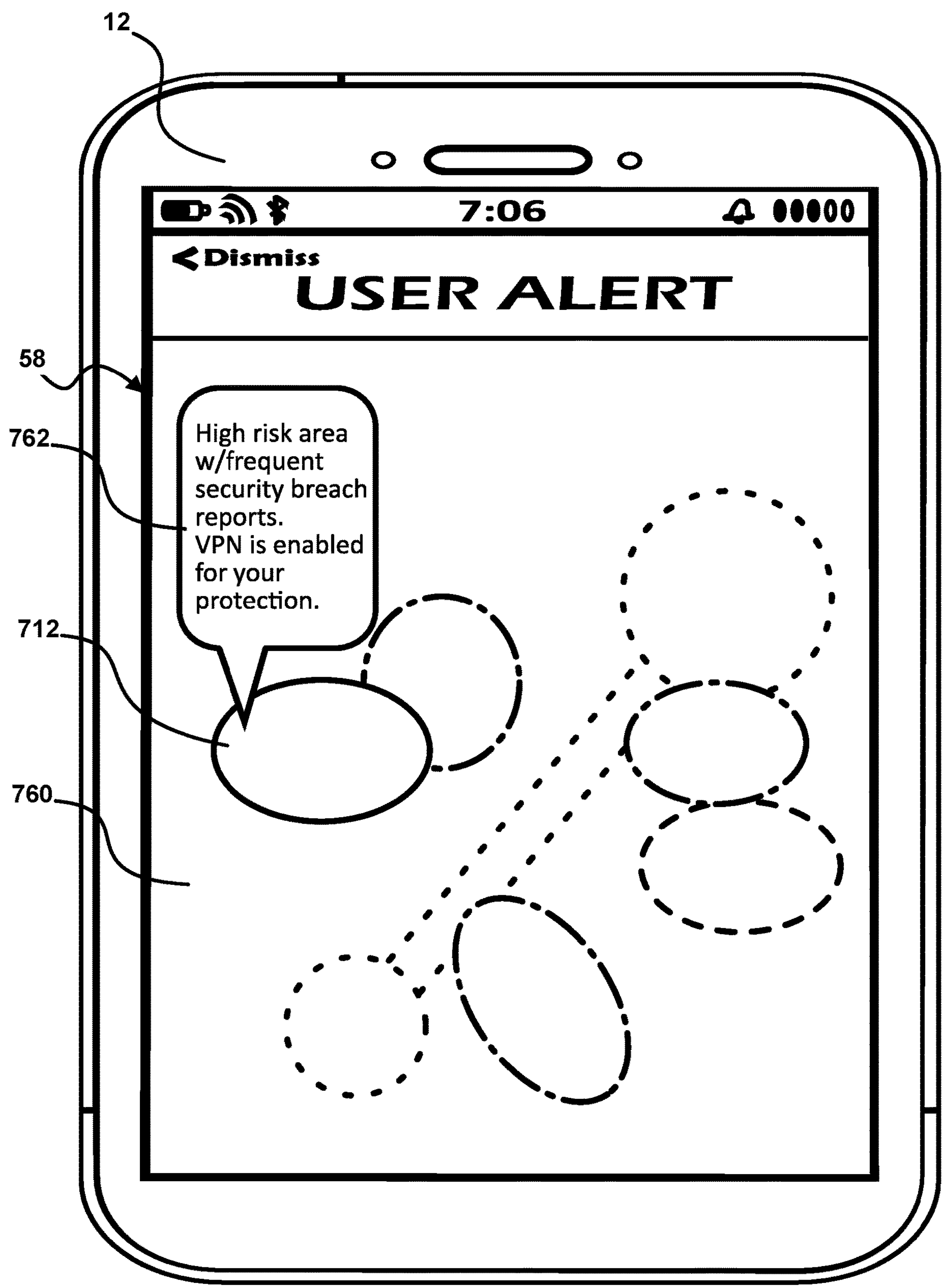

Referring to FIG. 6E, the second exemplary map display 760 including a risk map of the type shown in FIG. 6C is displayed by the security agent 14 in the user interface 58 of a user device 12 when the user device 12 is determined to be located at or near the abandoned building 712 point of interest corresponding to frequent security breach reports. A second risk notification 762 indicates the abandoned building 712 is a "[h]igh risk area [with] frequent [computer] security breach reports [(e.g., hacking reports)]", and that "VPN [('a virtual private network')] is enabled for your protection". The notifications and corresponding risk maps can further be sent to other users on other devices for example to a parent of a user of a user device 12 on which the security agent 14 is executed if the user device 12 is located at or near a location corresponding to a predicted high security risk.

Security protocols are beneficially actively configured per location according to a generated security risk map to maximize security with a minimum amount of user inconvenience. At geographic areas determined to be high risk (e.g., abandoned buildings), a safe device mode can be automatically enabled by the security agent 14, for example disabling sensitive network traffic such as financial transactions and not permitting the showing of or changing of user passwords. In such safe device mode maximum login protection can be required by the security agent 14, for example requiring two or more of passcode, face recognition, fingerprint and voice recognition with voice and sensor sentiment analysis. Such voice and sensor sentiment analysis can indicate stress level/sentiment, wherein if a high probability of physical stress is determined, the security agent 14 puts the user device 12 into an emergency mode and prevents all communication and network traffic except emergency/stress communications/calls. Further at geographic areas determined to be high risk, the security agent 14 beneficially initiates a VPN for all network communication including Internet connections. At geographic areas determined to be medium risk (e.g., public transit), the security agent 14 beneficially requires a user of the user device 12 to use medium login protection, for example one of passcode, face recognition, and fingerprint authentication procedures. Further at geographic areas determined to be medium risk, the security agent 14 initiates a VPN for sensitive Internet connections or other sensitive network communications, for example financial transactions. At geographic areas determined to be low risk or safe (e.g., a user's home or office), the security agent 14 does not initiate a VPN and enables logins without passwords or other authentication, or allows weak forms of login authentication, for example a preset hand gesture.

Figure 4A:
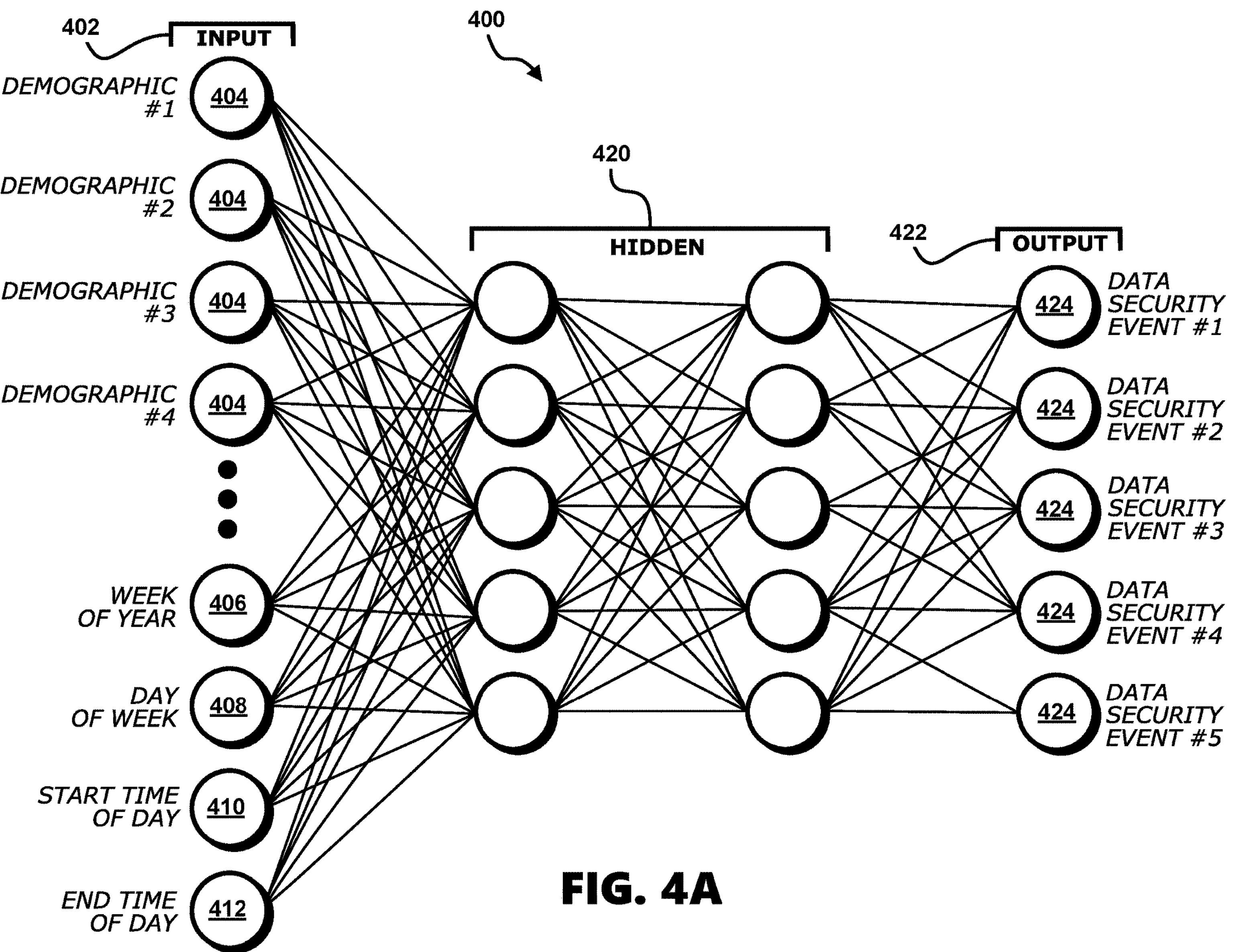

Referring to FIG. 4A, an exemplary classifier in the form of a first artificial neural network 400 is shown useful for performing herein-described methods. Alternatively, other classifier types can be implemented such as linear regression, Naïve Bayes, logistic regression, decision tree, boosted tree, support vector machine, artificial neural network, nearest neighbor, K-means, dimensionality reduction algorithm, or gradient boosting algorithm classifiers. The first artificial neural network 400 includes an input layer 402, a hidden layer 420, and an output layer 422. The input layer 402 includes determined demographic information indications 404 of a location where a user device 12 is located during a time period defined by one or more time stamps indicating a week of the year 406, day of the week 408, start time of the day 410, and end time of the day 412, the location determined for example by an LDS 64 of the user device 12. The demographic information indications 404 can be determined based on data from the demographic datastore 36 or alternatively from an external data API 90 enabled by a network-accessible data repository (e.g., a public government data repository) and then stored in the demographics datastore 36. The determined demographic information indications 404 can include for example one or more of indications of residential areas, indications of commercial areas, indications of population densities, indications of property values, indications of income level or distribution, and indications of school ratings. Four demographic information indications 404 are shown, however any suitable number of demographic information indications can be input.

The output layer 422 includes data security event indications 424 which can be populated during classifier training for example based on the monitoring of data security events on the user device 12, or alternatively a router 13, as described with reference to step 302 of the method 300. Data security event indications 424 can include for example indications of credential strengths, password strengths, computer virus attacks, freeze events initiated by telecommunication carriers, and initiations of device tracking applications. Hidden layers of nodes 420 are shown for convenience of illustration as two five node rows. Alternatively, other suitable number and arrangement of hidden nodes can be implemented. In training the first artificial neural network 400, demographic information indications 404, week of the year 406, day of the week 408, start time of the day 410, and end time of day 412 are provided as the input layer 402, the corresponding data security event indications 424 are provided as the output layer 422, and backpropagation is beneficially employed. Alternatively, other machine learning protocols may be implemented for training the first artificial neural network 400.

Figure 4B:
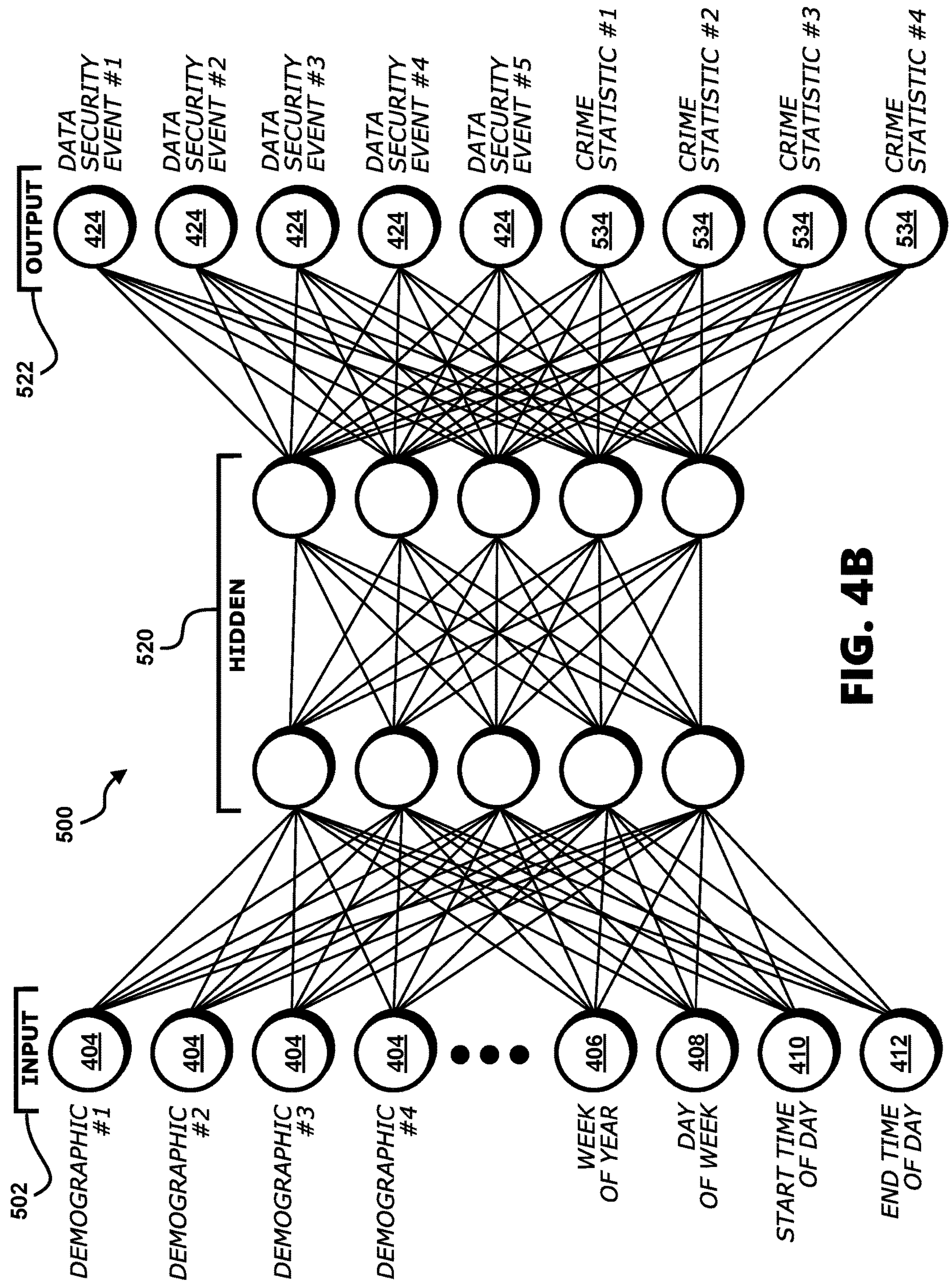

Referring to FIG. 4B, an exemplary classifier in the form of a second artificial neural network 500 is shown useful for performing herein-described methods. The second artificial neural network 500 includes an input layer 502, a hidden layer 520, and an output layer 522. Like the input layer 402 of the first artificial neural network 400, the input layer 502 includes determined demographic information indications 404 which correspond to where a user device 12 is located during a time period defined by one or more time stamps indicating a week of the year 406, day of the week 408, start time of the day 410, and end time of the day 412, as determined for example by an LDS 64 of the user device 12. Like the output layer 422 of the first artificial neural network 400, the output layer 522 includes data security event indications 424 which can be populated during classifier training for example based on the monitoring of data security events of a plurality of user devices 12 as described in the step 302 of the method 300. The output layer 522 further includes determined criminal statistical data indications 534 including for example one or more of indications of device thefts, physical assaults, or kidnappings, which data corresponds to where a user device 12 is located as determined for example by the LDS 64. Hidden layers of nodes 520 are shown for convenience of illustration as two five node rows. Alternatively, other suitable number and arrangement of hidden nodes can be implemented. In training the second artificial neural network 500, demographic information indications 404, week of the year 406, day of the week 408, start time of the day 410, and end time of day 412 are provided as the input layer 502, the corresponding data security event indications 424 and criminal statistical data indications 534 are provided as the output layer 522, and backpropagation is beneficially employed. Alternatively, other machine learning protocols may be implemented for training the second artificial neural network 500.

Figure 4C:
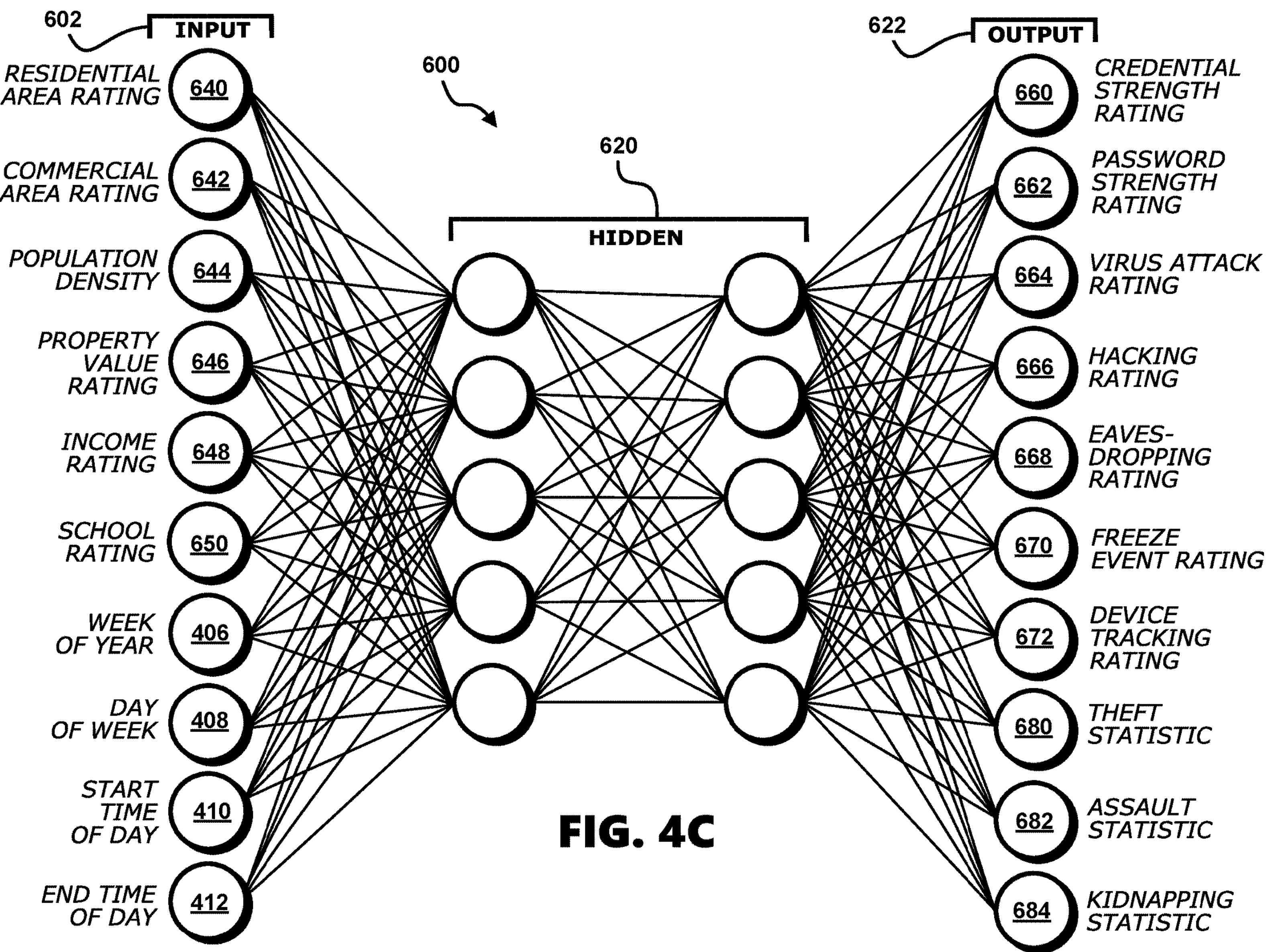

Referring to FIG. 4C, an exemplary classifier in the form of a third artificial neural network 600 is shown useful for performing herein-described methods. The third artificial neural network 600 includes an input layer 602, a hidden layer 620, and an output layer 622. Like the input layers 402, 502 of the first artificial neural network 400 and second artificial neural network 500 respectively, the input layer 602 includes determined demographic information indications, the demographic information indications being specifically defined as numerical indications of a residential area rating 640, a commercial area rating 642, a population density 644, a property value rating 646, an income rating 648, and a school rating 650. The determined demographic information indications 640, 642, 644, 646, 648, 650 correspond to where a user device 12 is located during a time period defined by one or more time stamps indicating a week of the year 406, day of the week 408, start time of the day 410, and end time of the day 412 as determined for example by an LDS 64 of the user device 12. Like the output layers 422, 522 of the first artificial neural network 400 and second artificial neural network 500 respectively, the output layer 622 includes data security event indications, the data security event indications being specifically defined as numerical indications of a credential strength rating 660, a password strength rating 662, a virus attack rating 664, a device hacking rating 666, a device eavesdropping rating 668, a rating of freeze events initiated by telecommunication carriers 670, and a rating of initiations of device tracking applications 672. Like the output layer 522 of the second artificial neural network 500, the output layer 622 includes criminal statistical data indications, the criminal statistical data indications being specifically defined as numerical indications of a theft statistic 680, a physical assault statistic 682, and a kidnapping statistic 684. Hidden layers of nodes 620 are shown for convenience of illustration as two five node rows. Alternatively, other suitable number and arrangement of hidden nodes can be implemented. In training the third artificial neural network 600, demographic information indications 640, 642, 644, 646, 648, 650, week of the year 406, day of the week 408, start time of the day 410, and end time of day 412 are provided as the input layer 602, the corresponding data security event indications 660, 662, 664, 666, 668, 670, 672 and criminal statistical data indications 680, 682, 684 are provided as the output layer 622, and backpropagation is beneficially employed. Alternatively, other machine learning protocols may be implemented for training the third artificial neural network 600.

FIG. 9 illustrates in abstract the function of an exemplary computer system 1000 on which the systems, methods and processes described herein can execute. For example, the user device 12, security manager 20, telecom API 80, and external data API 90 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the Internet, mobile telephone networks, Plain Old Telephone (POTS) networks, and wireless data networks, for example WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method of protecting computing devices operating in a network from security threats, the method comprising:

monitoring a plurality of data security events on a plurality of mobile computing devices;

monitoring a plurality of geographic locations of the plurality of mobile computing devices comprising a plurality of geographic positions of the plurality of mobile computing devices when the plurality of data security events occurred;

determining a plurality of demographic information of the plurality of geographic positions;

training at least one classifier based on the plurality of data security events and the plurality of demographic information;

determining a particular mobile computing device is located at a particular geographic location;

determining particular demographic information of the particular geographic location;

applying the at least one classifier to the particular demographic information;

generating a particular security risk prediction of the particular geographic location at least based on the applying of the at least one classifier; and activating a particular security measure on the particular mobile computing device based on the particular security risk prediction.

2. The method of claim 1, the activating the particular security measure comprising at least one of disabling particular network traffic or enabling a particular authentication protocol on the particular mobile computing device.

3. The method of claim 1, the activating the particular security measure comprising enabling a plurality of authentication protocols to enable a functional component of the particular mobile computing device.

4. The method of claim 3, the enabling the plurality of authentication protocols comprising enabling at least two of passcode authentication, voice recognition authentication, face recognition authentication, or fingerprint authentication to enable the functional component of the particular mobile computing device.

5. The method of claim 1, further comprising generating an alert on the particular mobile computing device based on the particular security risk prediction of the particular geographic location.

6. The method of claim 1, the activating the particular security measure comprising activating a virtual private network ("VPN") through which the particular mobile computing device connects to at least one of a local area network ("LAN") or a wide area network ("WAN").

7. The method of claim 1, further comprising:

applying the at least one classifier to multiple demographic information of multiple geographic locations to generate a risk map, the multiple geographic locations comprising the particular geographic location, the risk map comprising multiple security risk predictions in a particular geographic area defined by the multiple geographic locations;

determining the particular mobile computing device is located at another geographic location, the risk map comprising the another geographic location comprising another security risk prediction; and activating another security measure when the particular mobile computing device is located at the another geographic location based on the another security risk prediction.

8. The method of claim 1, the monitoring the plurality of data security events comprising at least one of:

monitoring computer virus attacks on the plurality of mobile computing devices;

monitoring credentials used by the plurality of mobile computing devices for network communicating; or monitoring passwords used for network communicating.

9. The method of claim 1, further comprising:

determining a plurality of criminal statistical data of the plurality of geographic positions; and further training the at least one classifier based on the criminal statistical data of the plurality of geographic positions.

10. The method of claim 9, the generating the particular security risk prediction further comprising predicting a probability of a criminal event, the method further comprising activating the particular security measure further based on the probability of the criminal event and a severity of the criminal event.

11. The method of claim 1, the determining of the plurality of demographic information comprising determining at least one of an indication of a residential area, an indication of a commercial area, a population density, an indication of property values, an indication of income distribution, or an indication of school ratings.

12. The method of claim 1, the training the at least one classifier comprising training at least one of an artificial neural network classifier, a logistic regression classifier, a decision tree classifier, or a random forest classifier.

13. The method of claim 1, the training the at least one classifier comprising:

providing the plurality of demographic information as an input to the at least one classifier; and providing the plurality of data security events as an output to the at least one classifier.

14. The method of claim 13, the at least one classifier comprising an artificial neural network classifier, and the method further comprising applying backpropagation in training the artificial neural network classifier.

15. The method of claim 1, wherein generating the particular security risk prediction comprises predicting a probability of an occurrence of at least one data security event.

16. The method of claim 15, wherein generating the particular security risk prediction further comprises determining a severity of the at least one data security event.

17. The method of claim 1, further comprising:

monitoring certain data security events on the particular mobile computing device;

monitoring certain geographic locations of the particular mobile computing device comprising certain geographic positions of the particular mobile computing device when the certain data security events respectively occurred on the particular mobile computing device; and generating the particular security risk prediction further based on the certain data security events and the certain geographic positions.

18. The method of claim 17, further comprising:

applying the at least one classifier to multiple demographic information of multiple geographic locations to generate a first risk map, the multiple geographic locations comprising the particular geographic location, and the first risk map comprising multiple security risk predictions in a geographic area defined by the multiple geographic locations;

generating a second risk map based on the certain data security events and the certain geographic positions;

generating a third risk map based on the first risk map and the second risk map, the third risk map comprising another geographic location comprising another security risk prediction;

determining the particular mobile computing device is located at the another geographic location comprising the another security risk prediction; and activating another security measure when the particular mobile computing device is located at the another geographic location based on the another security risk prediction.

19. The method of claim 1, further comprising:

receiving via the network an indication of at least an age or a body type of a particular user of the particular mobile computing device; and generating the particular security risk prediction of the particular geographic location further based on the at least one of the age or the body type of the particular user.

20. The method of claim 1, the monitoring the plurality of data security events comprising at least one of:

monitoring of freeze events initiated by a carrier system on the plurality of mobile computing devices; or monitoring of an initiation of a device tracking application on the plurality of mobile computing devices.

21. The method of claim 1, further comprising:

determining a plurality of times when the plurality of data security events occurred;

training the at least one classifier further based on the plurality of times when the plurality of data security events occurred;

determining the particular mobile computing device is located at the particular geographic location at a particular time; and applying the at least one classifier further to the particular time to generate the particular security risk prediction.

22. A method of protecting a computing device from security threats, the method comprising:

collecting indications of security events for a geographic area;

mapping a first security risk prediction to a first geographic location of the geographic area based at least on the security events;

determining a particular mobile computing device is located at the first geographic location; and activating a first security measure on the particular mobile computing device at least based on the first security risk prediction of the first geographic location.

23. The method of claim 22, further comprising:

determining the particular mobile computing device is located at the first geographic location at a particular time; and activating the first security measure on the particular mobile computing device further based on the particular mobile computing device being located at the first geographic location at the particular time.

24. The method of claim 22, further comprising:

mapping a second security risk prediction to a second geographic location of the geographic area based at least on the security events;

determining the particular mobile computing device is located at the second geographic location; and activating a second security measure on the particular mobile computing device at least based on the second security risk prediction of the second geographic location and based on the particular mobile computing device being located at the second geographic location.

25. The method of claim 24, further comprising:

mapping a third security risk prediction to a third geographic location of the geographic area based at least on an interpolation of the first security risk prediction and the second security risk prediction;

determining the particular mobile computing device is located at the third geographic location; and activating a third security measure on the particular mobile computing device at least based on the third security risk prediction of the third geographic location and based on the particular mobile computing device being located at the third geographic location.

26. The method of claim 22, the collecting the indications of the security events comprising monitoring a plurality of data security events on a plurality of mobile computing devices, the plurality of data security events comprising a first data security event occurring at the first geographic location, the method further comprising:

monitoring a plurality of geographic locations of the plurality of mobile computing devices in the geographic area, the plurality of geographic locations comprising the first geographic location; and mapping the first security risk prediction to the first geographic location of the geographic area at least based on the first data security event.

27. The method of claim 26, the plurality of data security events comprising a plurality of computer virus attacks.

28. The method of claim 26, the collecting the indications of the security events further comprising collecting crime information, the method further comprising mapping the first security risk prediction to the first geographic location of the geographic area further based on the crime information.

29. The method of claim 26, the collecting the indications of the security events further comprising collecting crime information, the plurality of geographic locations further comprising a second geographic location of the geographic area, and the plurality of data security events further comprising a second data security event occurring at the second geographic location of the geographic area, the method further comprising:

mapping a second security risk prediction to the second geographic location of the geographic area based at least on the crime information and the second data security event; and activating a second security measure on the particular mobile computing device based on the second security risk prediction of the second geographic location and based on the particular mobile computing device being located at the second geographic location.

30. The method of claim 22, further comprising:

determining that the particular mobile computing device is positioned at the first geographic location during a plurality of time periods;

determining the first geographic location is a first point of interest based on the determining that the particular mobile computing device is positioned at the first geographic location during the plurality of time periods; and activating the first security measure on the particular mobile computing device further based on the determining that the first geographic location is the first point of interest.

31. The method of claim 22, the collecting the indications of the security events comprising collecting virus detection logs from a plurality of mobile computing devices and a plurality of geographic locations of logged viruses on the plurality of mobile computing devices.

32. The method of claim 22, the collecting the indications of security events comprising:

at least one of collecting freeze events initiated by a carrier system on a plurality of mobile computing devices or collecting initiations of a device tracking application on the plurality of mobile computing devices; and collecting a plurality of geographic locations of the at least one of the freeze events or the initiations of the device tracking application.

33. The method of claim 22, further comprising:

mapping a plurality of security risk predictions respectively to a plurality of geographic locations based at least on the security events;

determining the particular mobile computing device is located at the plurality of geographic locations at a respective plurality of times; and activating respectively a plurality of security measures at the respective plurality of times at least based on the plurality of security risk predictions and based on the particular mobile computing device being located at the plurality of geographic locations at the respective plurality of times.

34. The method of claim 33, further comprising:

mapping certain security risk predictions respectively to certain geographic locations based at least on the plurality of security risk predictions of the plurality of geographic locations, the certain geographic locations adjacent to the plurality of geographic locations;

determining the particular mobile computing device is located at the certain geographic locations at respective certain times; and activating respectively certain security measures at the respective certain times at least based on the certain security risk predictions and based on the particular mobile computing device being located at the certain geographic locations at the respective certain times.

35. The method of claim 22, further comprising:

receiving age information of a particular user of the particular mobile computing device; and activating the first security measure further based on the age information of the particular user.

36. The method of claim 22, further comprising:

receiving physical defense capacity information of a particular user of the particular mobile computing device; and activating the first security measure further based on the physical defense capacity information of the particular user.

37. The method of claim 22, further comprising:

receiving social networking history of a particular user of the particular mobile computing device; and activating the first security measure further based on the social networking history of the particular user.

38. The method of claim 22, the geographic area comprising a plurality of geographic locations, the method further comprising:

determining a plurality of demographic information of the plurality of geographic locations;

determining particular demographic information of the first geographic location; and mapping the first security risk prediction further based on the plurality of demographic information and the particular demographic information.

39. The method of claim 38, further comprising:

training at least one classifier based on the plurality of demographic information and the security events; and applying the at least one classifier to the particular demographic information to map the first security risk prediction.

40. The method of claim 22, further comprising transmitting a notification to a user via a network indicating the first security risk prediction.

41. The method of claim 22, further comprising:

recording by the particular mobile computing device voice of a particular user of the particular mobile computing device;

analyzing the voice of the particular user for a stress indication; and activating the first security measure on the particular mobile computing device further based on the stress indication.

42. The method of claim 22, the activating the first security measure comprising activating a virtual private network ("VPN") through which the particular mobile computing device connects to a wide area network ("WAN").

43. The method of claim 22, the activating the first security measure comprising enabling a plurality of authentication protocols to enable a functional component of the particular mobile computing device.

44. The method of claim 22, wherein generating the particular security risk prediction comprises determining a risk level based on probabilities of occurrences of the security events and severities of the security events.

* * * * *